(12) United States Patent
Nishimura et al.

(10) Patent No.: US 12,157,430 B2
(45) Date of Patent: Dec. 3, 2024

(54) AUTOMOBILE HOOD

(71) Applicant: NIPPON STEEL CORPORATION, Tokyo (JP)

(72) Inventors: Ryuichi Nishimura, Tokyo (JP); Koichi Hamada, Tokyo (JP); Yasunori Sawa, Tokyo (JP); Tohru Yoshida, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 37 days.

(21) Appl. No.: 17/911,308

(22) PCT Filed: Mar. 29, 2021

(86) PCT No.: PCT/JP2021/013383
§ 371 (c)(1),
(2) Date: Sep. 13, 2022

(87) PCT Pub. No.: WO2021/200860
PCT Pub. Date: Oct. 7, 2021

(65) Prior Publication Data
US 2023/0112540 A1  Apr. 13, 2023

(30) Foreign Application Priority Data

Mar. 30, 2020   (JP) ................................. 2020-059871

(51) Int. Cl.
*B60R 21/34*    (2011.01)
*B62D 25/10*    (2006.01)
*B62D 25/12*    (2006.01)

(52) U.S. Cl.
CPC ............ *B60R 21/34* (2013.01); *B62D 25/105* (2013.01); *B62D 25/12* (2013.01); *B60R 2021/343* (2013.01)

(58) Field of Classification Search
CPC ............................... B62D 25/105; B60R 21/34
See application file for complete search history.

(56) References Cited

U.S. PATENT DOCUMENTS

| | | | |
|---|---|---|---|
| 11,299,084 B2* | 4/2022 | Alexander | ................ B60P 7/04 |
| 11,685,336 B1* | 6/2023 | Farooq | .................... B60R 21/34 |
| | | | 180/271 |

(Continued)

FOREIGN PATENT DOCUMENTS

| | | |
|---|---|---|
| DE | 10.2008 046 910 A1 | 3/2010 |
| DE | 10 2011 119 093 A1 | 5/2013 |

(Continued)

*Primary Examiner* — Erez Gurari
(74) *Attorney, Agent, or Firm* — Birch, Stewart, Kolasch & Birch, LLP

(57) ABSTRACT

An automobile hood 1 has an inner panel 2, an outer panel 3, and a plurality of linear sealer regions A in which joints 21 are arranged. A region which includes the linear sealer region A and in which both ends in a longitudinal direction L of the linear sealer region A reach the outer circumferential edge of the inner panel 2 is defined as an end-to-end region B. Each of three longest linear sealer regions A2, A4 and A3 among the plurality of linear sealer regions A is a length that is 40% or more of the length of an end-to-end region B2, B4 or B3 to which the linear sealer regions A2, A4 or A3 belongs, respectively. These three end-to-end regions B2, B4 and B3 do not intersect with each other within a region surrounded by the outer circumferential edge of the inner panel 2.

14 Claims, 17 Drawing Sheets

(56) References Cited

U.S. PATENT DOCUMENTS

| | | | | |
|---|---|---|---|---|
| 2004/0182616 | A1* | 9/2004 | Mason | B60R 21/34 180/69.21 |
| 2010/0019540 | A1* | 1/2010 | Fujimoto | B62D 25/105 296/193.11 |
| 2012/0298436 | A1* | 11/2012 | Ho | B62D 29/005 180/69.2 |
| 2014/0062142 | A1* | 3/2014 | Ikeda | B62D 25/12 296/193.11 |
| 2014/0110971 | A1* | 4/2014 | Ray | B62D 25/105 296/187.09 |
| 2015/0028624 | A1* | 1/2015 | Wisniewski | B62D 25/105 296/187.03 |
| 2015/0353141 | A1* | 12/2015 | Yoshida | B62D 27/026 296/193.11 |
| 2016/0096505 | A1* | 4/2016 | Ikeda | B62D 29/005 296/193.11 |
| 2016/0251033 | A1* | 9/2016 | Kolar, Jr. | B62D 65/06 296/193.11 |
| 2017/0232925 | A1* | 8/2017 | Barbat | B60R 21/34 280/734 |
| 2017/0259855 | A1* | 9/2017 | Hammer | B60R 21/34 |
| 2017/0282978 | A1* | 10/2017 | Yoshida | B62D 25/105 |
| 2019/0016393 | A1* | 1/2019 | Patel | B32B 5/028 |
| 2019/0337259 | A1* | 11/2019 | Shirakami | B32B 15/08 |
| 2020/0391805 | A1* | 12/2020 | Kashima | E05B 85/045 |
| 2021/0016839 | A1* | 1/2021 | Lein | B62D 29/005 |
| 2021/0071690 | A1* | 3/2021 | Alexander | F15B 15/10 |
| 2021/0300479 | A1* | 9/2021 | Onaka | B62D 25/105 |
| 2021/0347414 | A1* | 11/2021 | Winkler | B62D 25/12 |
| 2022/0097773 | A1* | 3/2022 | Yoshida | B62D 29/008 |
| 2022/0097774 | A1* | 3/2022 | Yoshida | B60R 21/34 |
| 2022/0126926 | A1* | 4/2022 | Nishimura | B62D 29/005 |
| 2022/0274150 | A1* | 9/2022 | Yamazaki | B21D 22/22 |
| 2023/0112540 | A1* | 4/2023 | Nishimura | B60R 21/34 296/187.04 |
| 2023/0117169 | A1* | 4/2023 | Ishizuka | B62D 25/105 180/69.2 |
| 2023/0192001 | A1* | 6/2023 | Mellergård | B62D 25/12 296/37.1 |

FOREIGN PATENT DOCUMENTS

| | | |
|---|---|---|
| JP | 2004-136810 A | 5/2004 |
| JP | 2005-178422 A | 7/2005 |
| JP | 2005-193863 A | 7/2005 |
| JP | 2007-176328 A | 7/2007 |
| JP | 2012-214076 A | 11/2012 |
| JP | 2017-1553 A | 1/2017 |

* cited by examiner

FIRST MODIFICATION

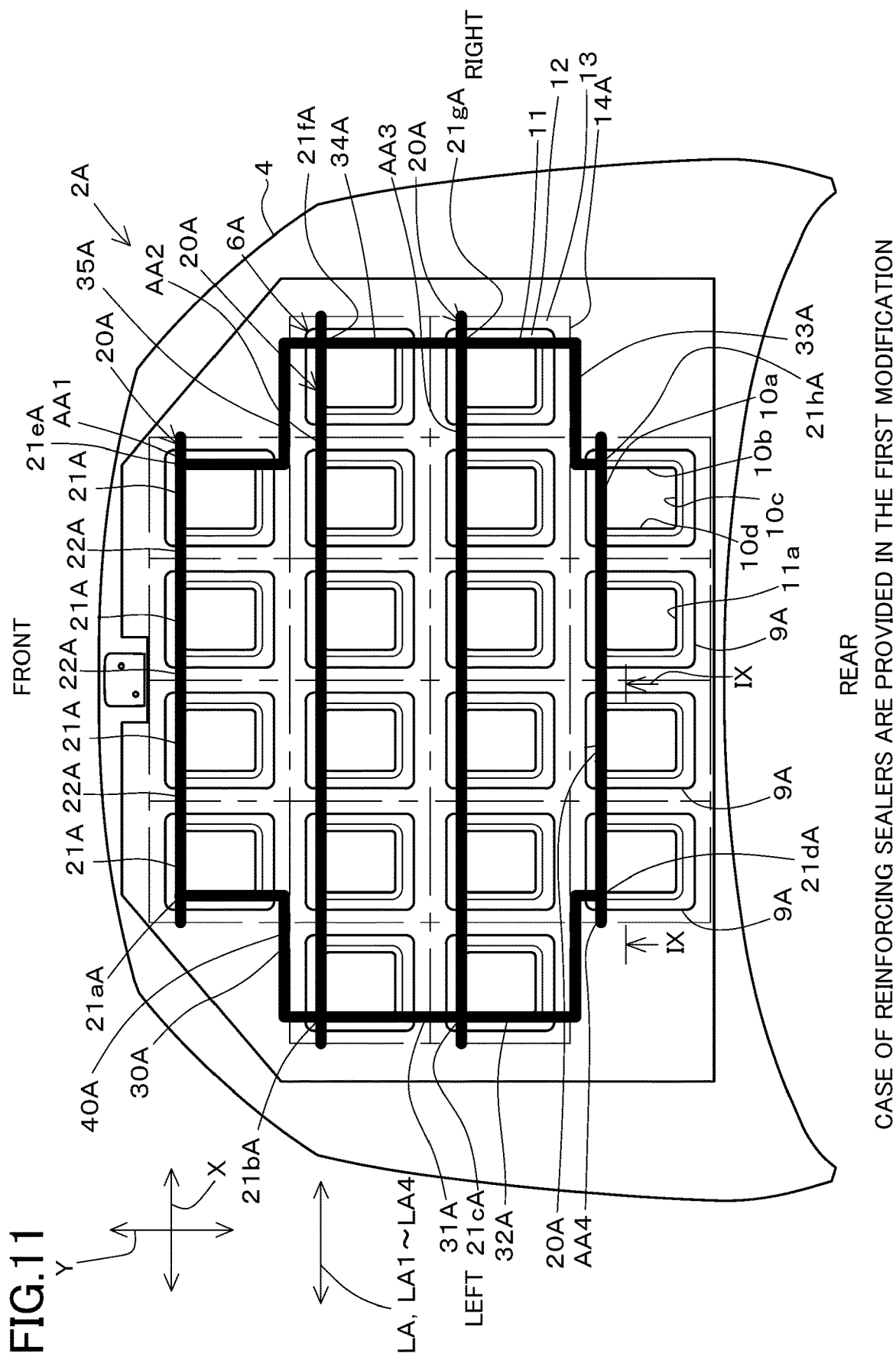

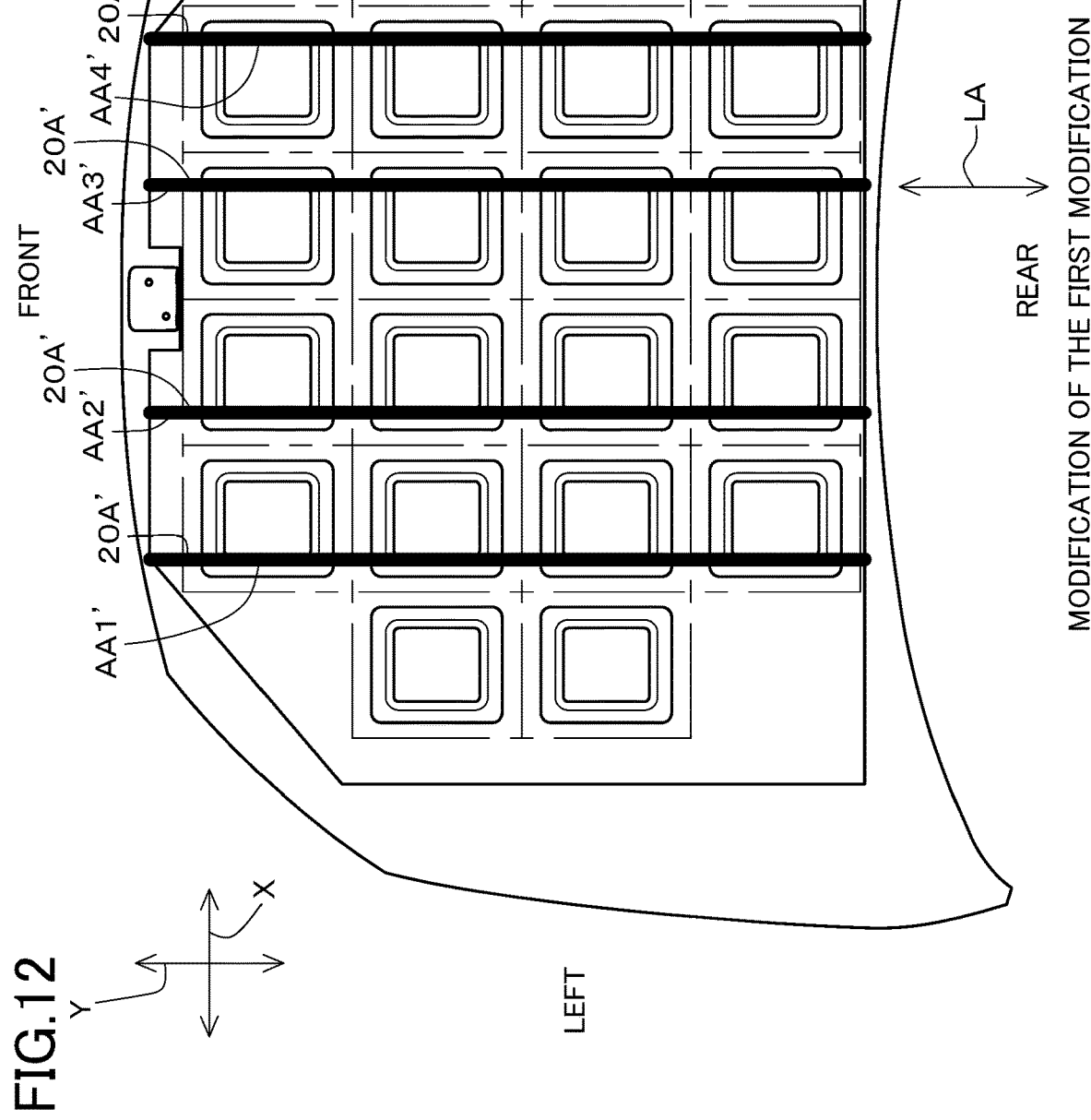

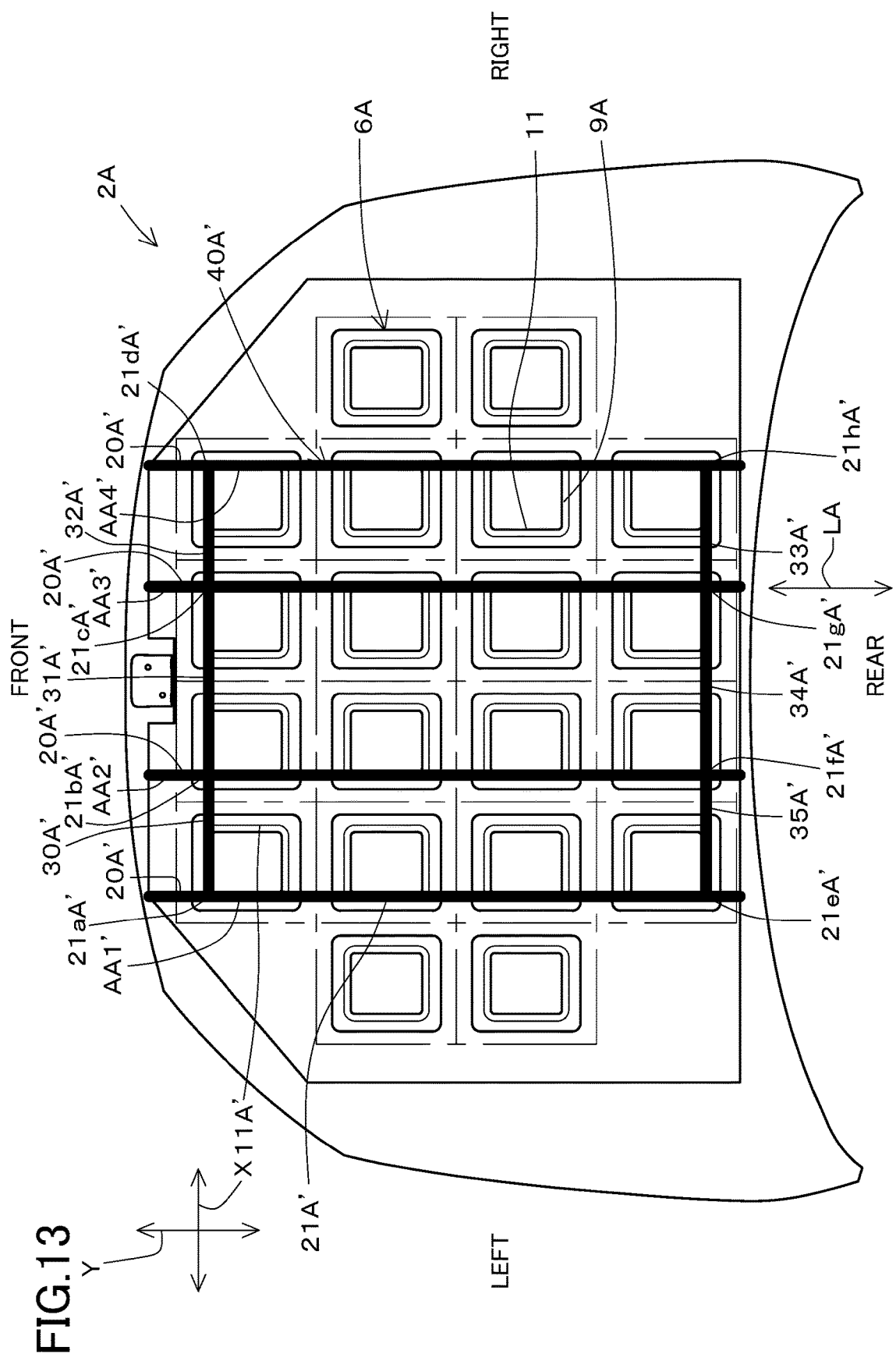

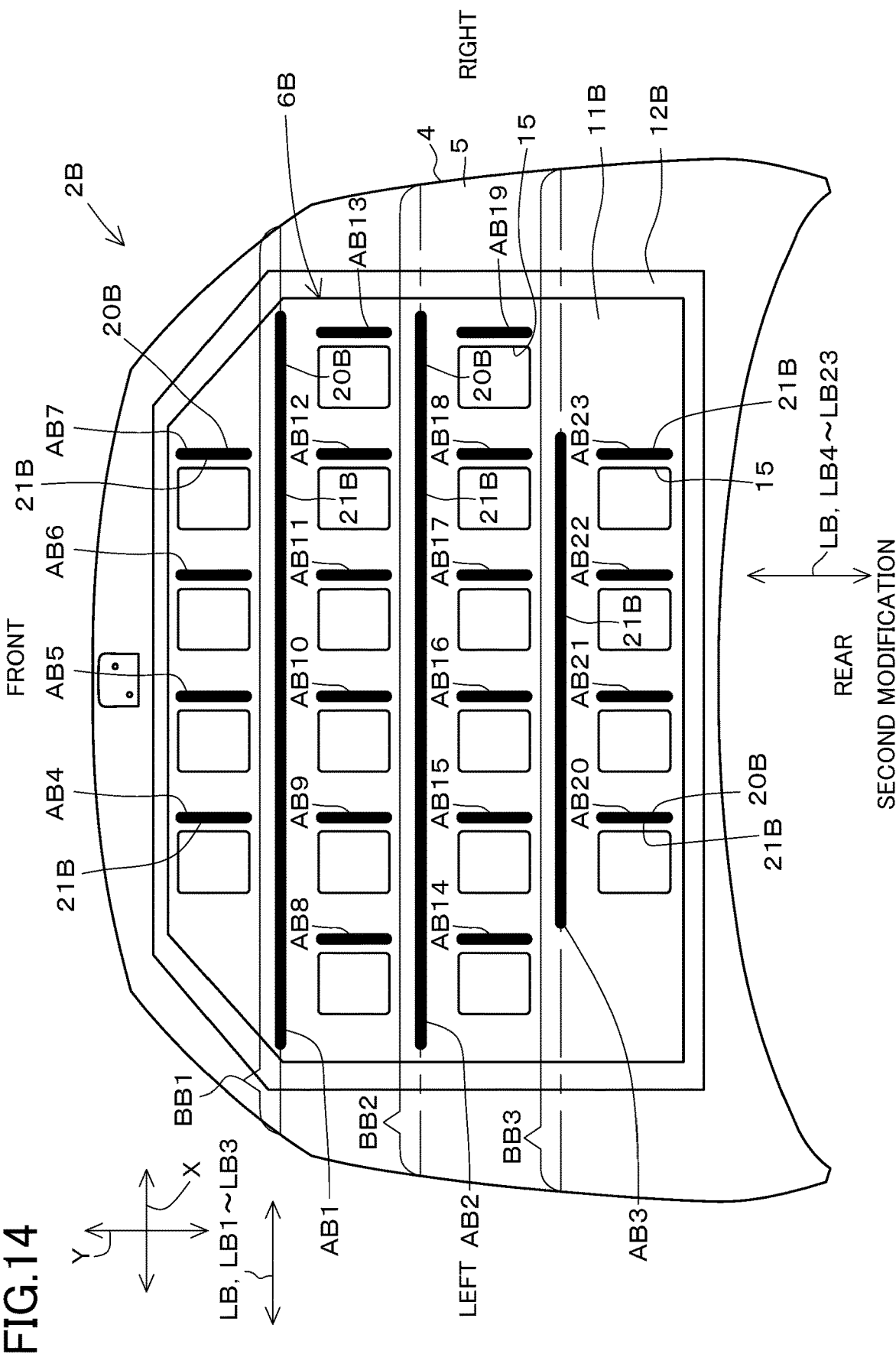

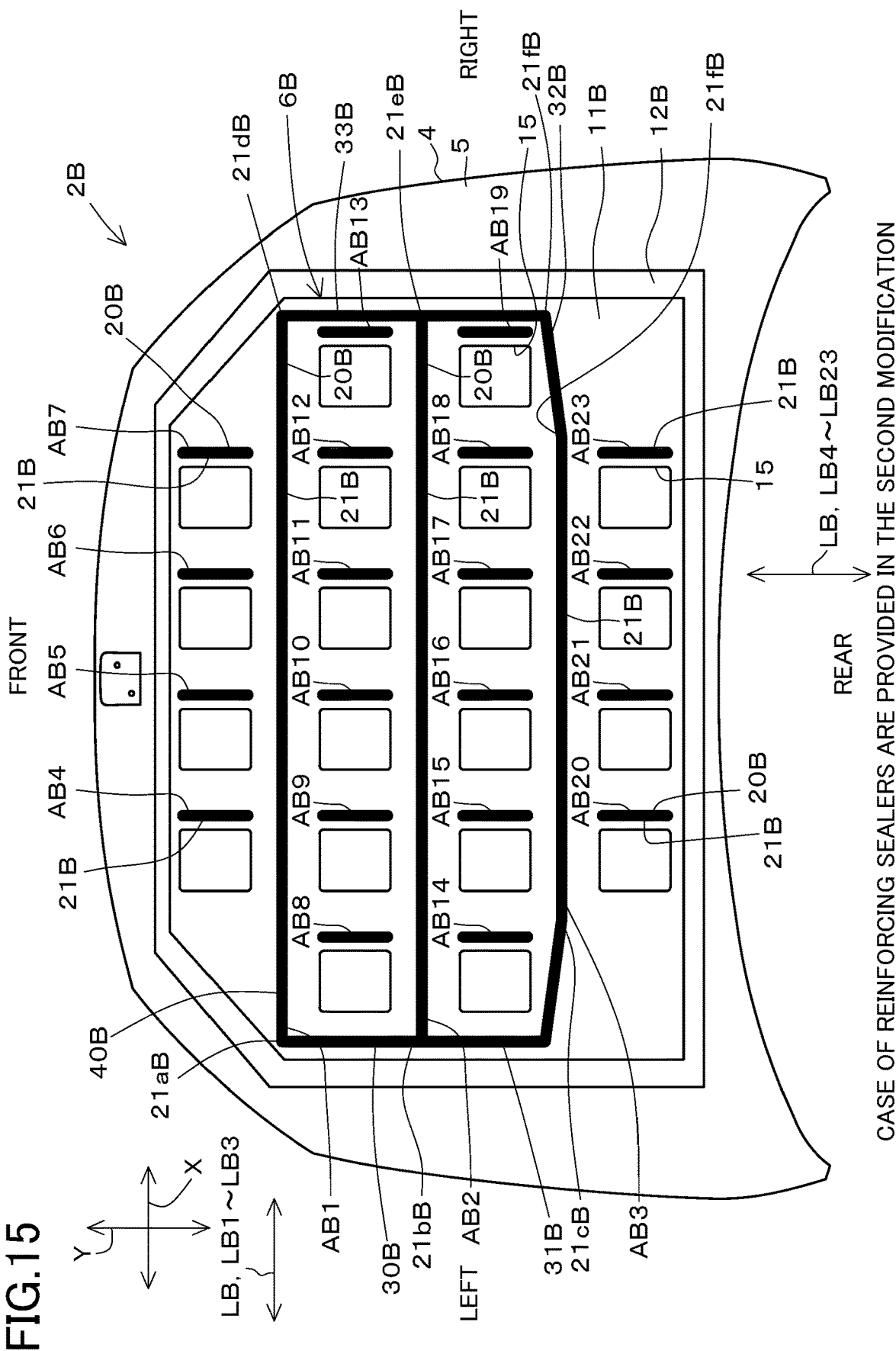

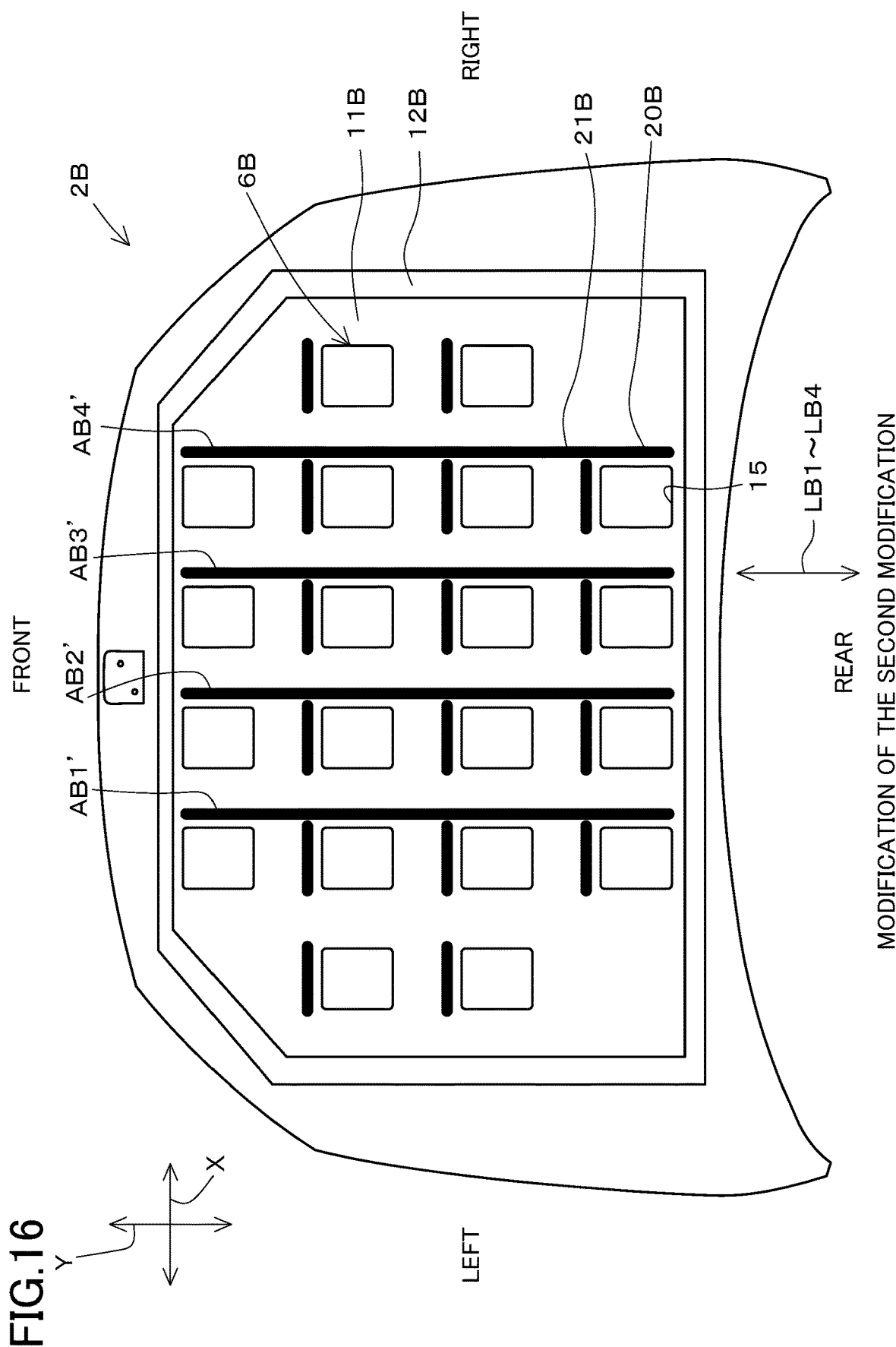

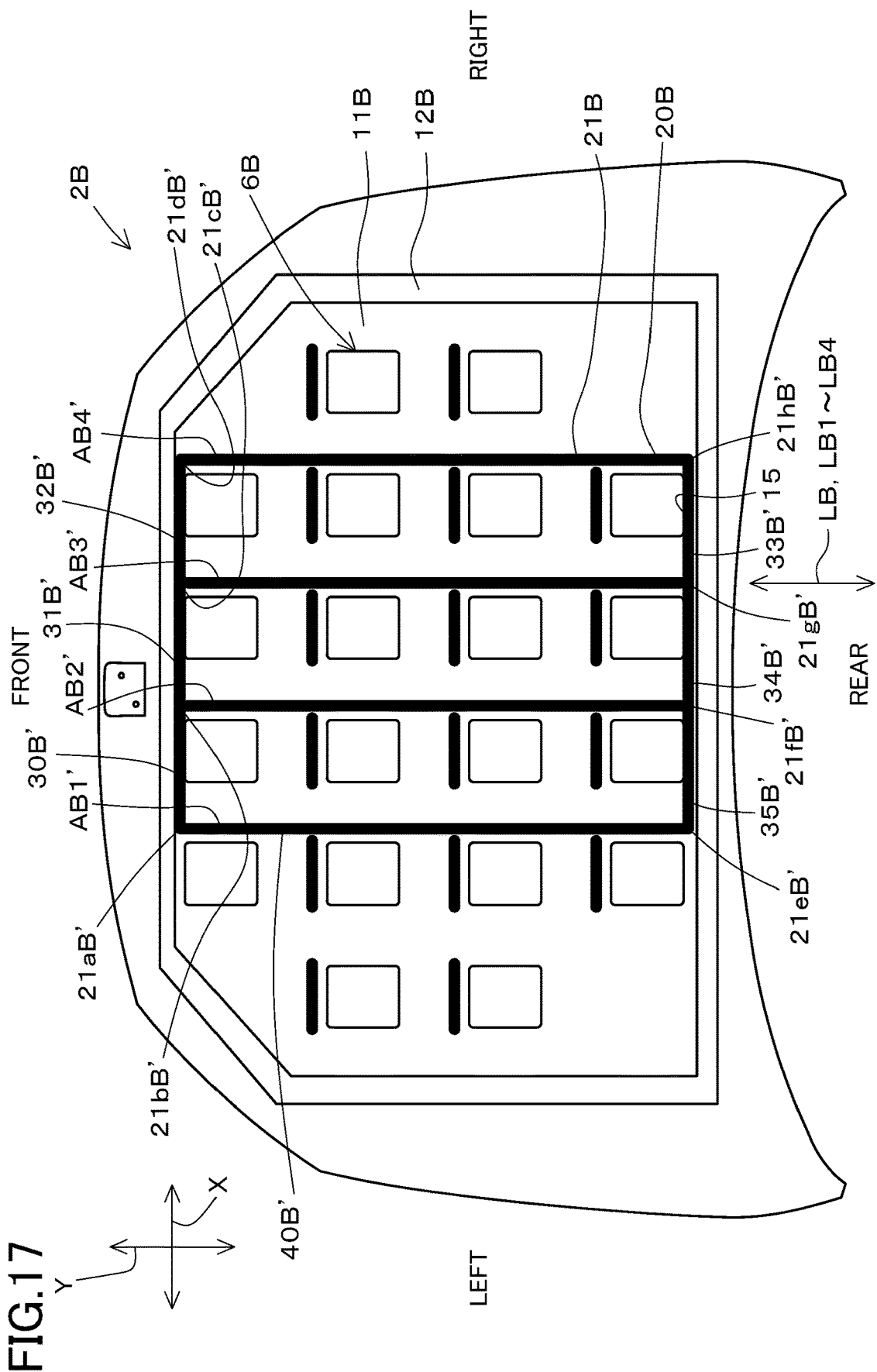

AUTOMOBILE HOOD

TECHNICAL FIELD

The present invention relates to an automobile hood.

BACKGROUND ART

Patent Document 1 discloses a hood panel for a vehicle. The principle purpose of the hood panel is to reduce the degree of injury to a pedestrian if the pedestrian collides with the hood panel.

Patent Document 2 discloses a hood for an automobile as exterior equipment for an automobile. The principle purpose of the hood for an automobile is to absorb the energy of contact when a pedestrian comes into contact with the hood for an automobile, by only deforming by a small amount in the inward direction of the automobile.

LIST OF PRIOR ART DOCUMENTS

Patent Documents

Patent Document 1: JP2005-193863A

Patent Document 2: JP2017-1553A

SUMMARY OF INVENTION

Technical Problem

In the automobile hood disclosed in Patent Document 1, an inner panel and an outer panel are joined using an adhesive. Mastic sealers and the like are known as adhesives for joining an inner panel and an outer panel. When assembling an automobile hood, for example, a mastic sealer is applied to the outer panel, and next, by superposing the inner panel and the outer panel on each other, the mastic sealer is sandwiched between the inner panel and the outer panel. By this means, the inner panel and the outer panel are joined to each other through the mastic sealer.

The operation to apply the mastic sealer to the outer panel is performed, for example, by a robot arm that holds a nozzle to which the sealer is supplied. From the viewpoint of shortening the time required for the application process through efficient application of the mastic sealer, the operation to apply the mastic sealer that is performed by the robot arm is preferably performed while moving the nozzle along the simplest possible path. On the other hand, if the amount of mastic sealer is reduced in order to shorten the time required for the operation to apply the mastic sealer, the strength with which the inner panel supports the outer panel will be lowered.

In both Patent Document 1 and Patent Document 2, there is no particular disclosure regarding a configuration for efficiently applying an adhesive such as a mastic sealer.

One objective of the present invention is, with respect to an automobile hood, to enable an increase in the efficiency of an operation for joining an inner panel and an outer panel while making the joining strength with which the inner panel and the outer panel are joined to each other sufficiently high.

Solution to Problem

The gist of the present invention is an automobile hood which is described hereunder.

(1) An automobile hood, including:

an inner panel, an outer panel, a sealer, and a joint that, in the sealer, is a portion which joins the inner panel and the outer panel, wherein:

a direction in which a linear sealer region in which the sealer is continuously arranged linearly extends is defined as a longitudinal direction;

a region of the inner panel that is a region which includes the linear sealer region and in which both ends in the longitudinal direction reach an outer circumference of the inner panel is defined as an end-to-end region;

at least three of the linear sealer regions are provided at intervals in at least one of a front-rear direction of the automobile hood and a width direction of the automobile hood;

each of three longest linear sealer regions among the plurality of linear sealer regions has a length that is 40% or more of a length of the end-to-end region to which the linear sealer region itself belongs, and the joint is formed therein; and three end-to-end regions that include the three longest linear sealer regions among the plurality of linear sealer regions do not intersect with each other within a region that is surrounded by an outer circumferential edge of the inner panel.

(2) The automobile hood according to the above (1), wherein the length is a length when the automobile hood is seen in plan view.

(3) The automobile hood according to the above (1) or the above (2), wherein, in at least one of the plurality of linear sealer regions, the joints are intermittently arranged in the longitudinal direction.

(4) The automobile hood according to any one of the above (1) to the above (3), wherein, in at least one of the plurality of linear sealer regions, the joint extends continuously along the longitudinal direction.

(5) The automobile hood according to any one of the above (1) to the above (4), wherein at least one pair of linear sealer regions among the plurality of the linear sealer regions are arranged in parallel with each other.

(6) The automobile hood according to any one of the above (1) to the above (5), wherein:

the inner panel includes a unit, the unit includes a flange that is arranged adjacent to the outer panel, an inclined wall that extends from the flange so as to separate from the outer panel, and a bottom portion that is continuous with the inclined wall and is separated from the flange; and in at least one of the plurality of linear sealer regions, the joint is provided on the flange.

(7) The automobile hood according to the above (6), wherein:

the flange of the unit is formed in an annular shape; and in at least one of the plurality of linear sealer regions, all of the joints are arranged at places that are offset from a center of the annular-shaped flange.

(8) The automobile hood according to the above (6) or the above (7), wherein:
a plurality of the units are provided in the inner panel, and
in at least one of the plurality of linear sealer regions, the joint is provided on the flange in each of a plurality of the units.
(9) The automobile hood according to any one of the above (6) to the above (8), wherein a plurality of the units having the same shape are arranged in the front-rear direction and the width direction of the automobile hood.
(10) The automobile hood according to any one of the above (1) to the above (9), wherein:
the sealer includes a reinforcing sealer,
the linear sealer region includes an end portion joint that is arranged at an endmost portion in the longitudinal direction among the joints of the linear sealer region, and
the reinforcing sealer connects together end portions of the end portion joints of the plurality of linear sealer regions in which the longitudinal directions are different.
(11) The automobile hood according to the above (10), wherein the reinforcing sealer cooperates with the sealers of the plurality of linear sealer regions to form an annular sealer.
(12) The automobile hood according to any one of the above (1) to the above (11), wherein the inner panel is a steel sheet panel having a thickness of 0.25 mm to 0.80 mm, or is an aluminum alloy panel having a thickness of 0.40 mm to 1.20 mm.
(13) The automobile hood according to any one of the above (1) to the above (12), wherein the outer panel is a steel sheet panel having a thickness of 0.25 mm to 0.80 mm, or is an aluminum alloy panel having a thickness of 0.40 mm to 1.20 mm.
(14) The automobile hood according to any one of the above (1) to the above (13), wherein:
in three longest linear sealer regions, a portion of the sealer that is separated from either one of the inner panel and the outer panel is a non-joint portion; and
in each of the three longest linear sealer regions, the joint and the non-joint portion are alternately arranged in the longitudinal direction.

Advantageous Effect of Invention

According to the present invention, the efficiency of an operation for joining an inner panel and an outer panel in an automobile hood can be increased while making the joining strength with which the inner panel and the outer panel are joined to each other sufficiently high.

BRIEF DESCRIPTION OF DRAWINGS

FIG. 11 is a plan view of an inner panel of an automobile hood in a modification in which reinforcing sealers are provided in the first modification.
FIG. 12 is a plan view of the inner panel of the modification of the first modification.
FIG. 13 is a plan view of the inner panel of the automobile hood in an example in which reinforcing sealers are provided in the modification of the first modification.
FIG. 14 is a plan view of an inner panel pertaining to a second modification of the present invention.
FIG. 15 is a plan view of an inner panel of an automobile hood in an example in which reinforcing sealers are provided in the second modification.
FIG. 16 is a plan view of an inner panel of a modification of the second modification.
FIG. 17 is a plan view of the inner panel of the automobile hood in an example in which reinforcing sealers are provided in the modification of the second modification.

DESCRIPTION OF EMBODIMENT

Hereunder, first, the circumstances leading to the conception of the present invention will be described, and then an embodiment will be described in detail.

[Circumstances Leading to Conception of Present Invention]

Generally, in an automobile hood, the outer panel is a relatively flat shape, while on the other hand the inner panel is a shape having unevenness. Further, a sealer such as a mastic sealer is applied at places in the inner panel that are convex toward the outer panel side. The sealer contacts the inner panel and the outer panel and joins these panels together. Further, in the automobile hood, the height (thickness) in the vehicle height direction is less than the length in the vehicle length direction and the length in the vehicle width direction of the automobile. Therefore, when the sealer is to be applied to the outer panel or inner panel during assembling of the automobile hood, the amount of movement of a nozzle for applying the sealer in the directions (vehicle length direction and vehicle width direction) that are orthogonal to the thickness direction of the automobile hood influences the time taken to perform the sealer application operation. Hence, taking into consideration the magnitude of the influence on the total movement length of a nozzle for applying sealer during production of one automobile hood, the present inventors conceived of devising a suitable layout for sealer by taking a long region of sealer as a target, which is a region that easily contributes to shortening the sealer application time. As a result, the present invention has been conceived. Hereunder, one example of the present invention is specifically described.

DESCRIPTION OF EMBODIMENT

Hereunder, an embodiment of the present invention is described while referring to the accompanying drawings.

Figure 1:
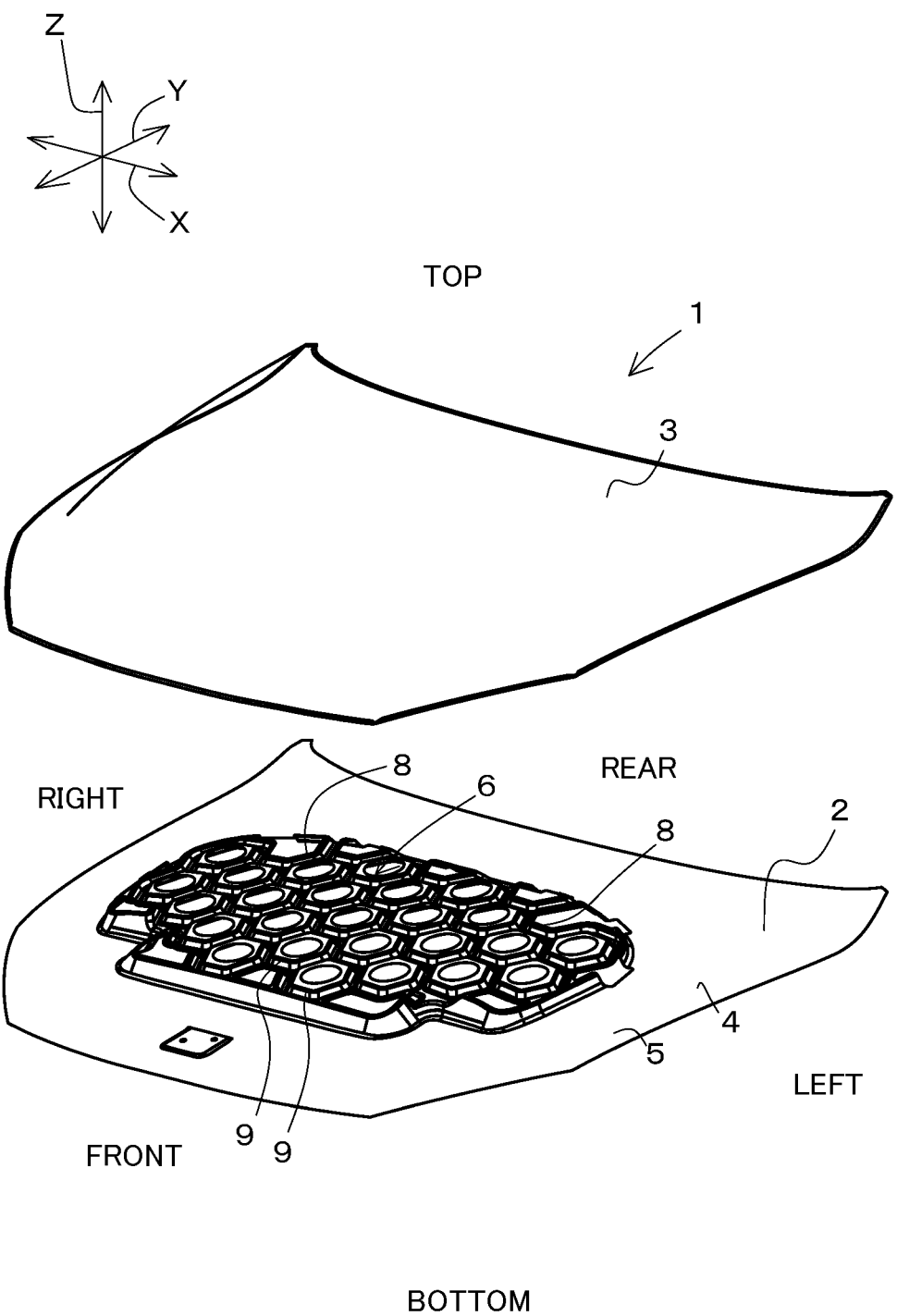
FIG. 1 is a schematic exploded perspective view of an automobile hood according to one embodiment of the present invention, in which diagrammatic representation of a sealer is omitted.
Figure 2:
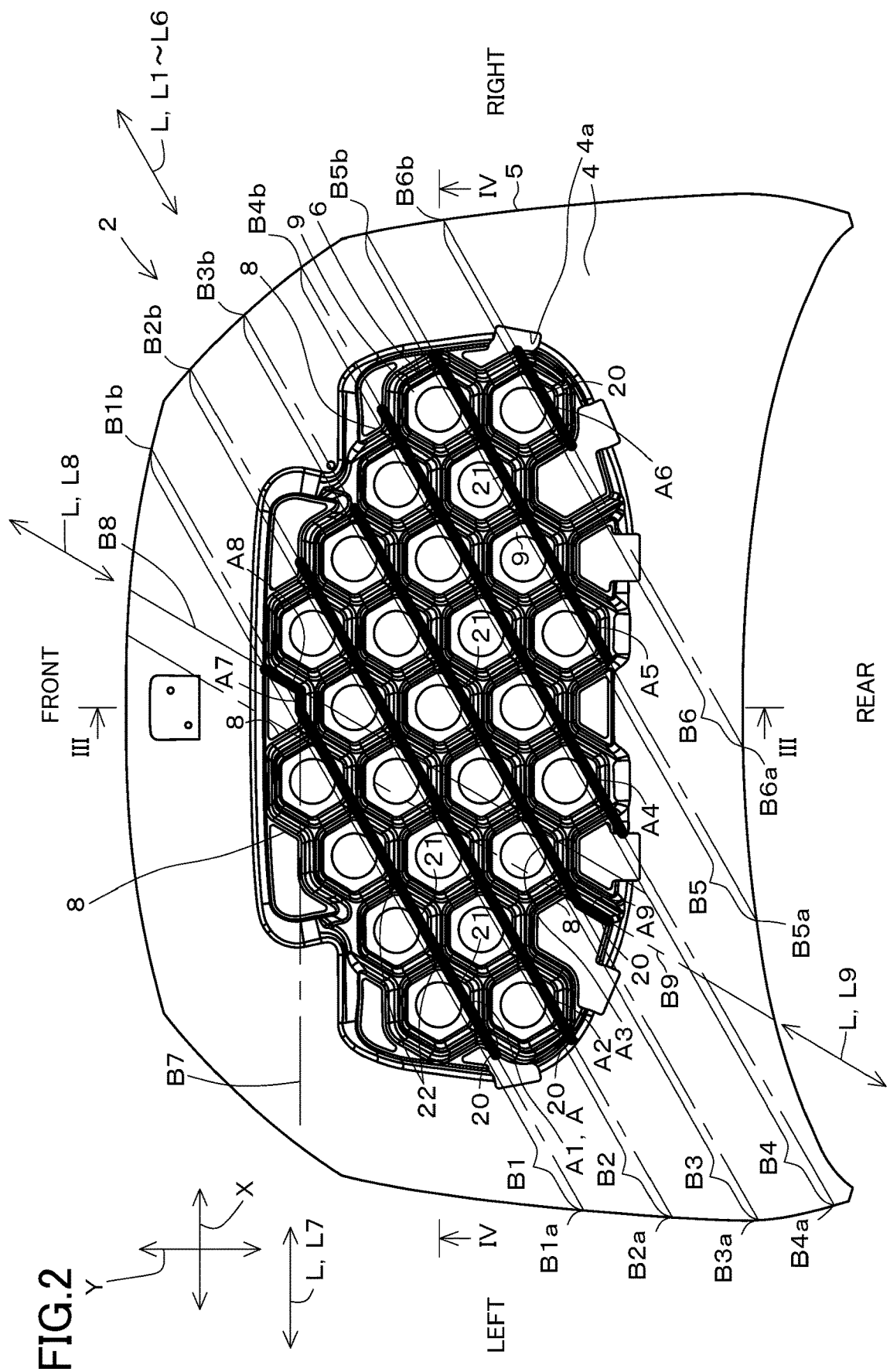
FIG. 2 is a plan view of an inner panel of the automobile hood.
Figure 3:
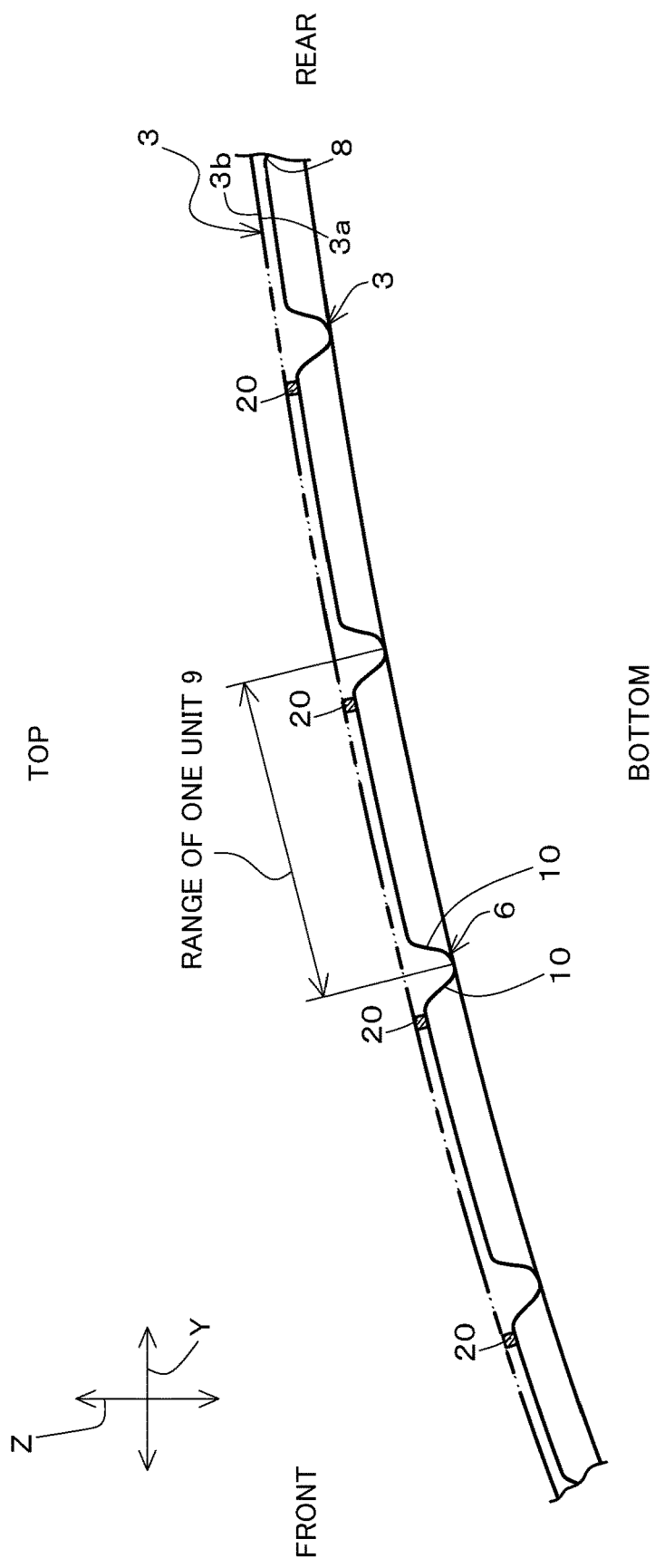
FIG. 3 is a schematic cross-sectional view along a line III-III in FIG. 2.
Figure 4:
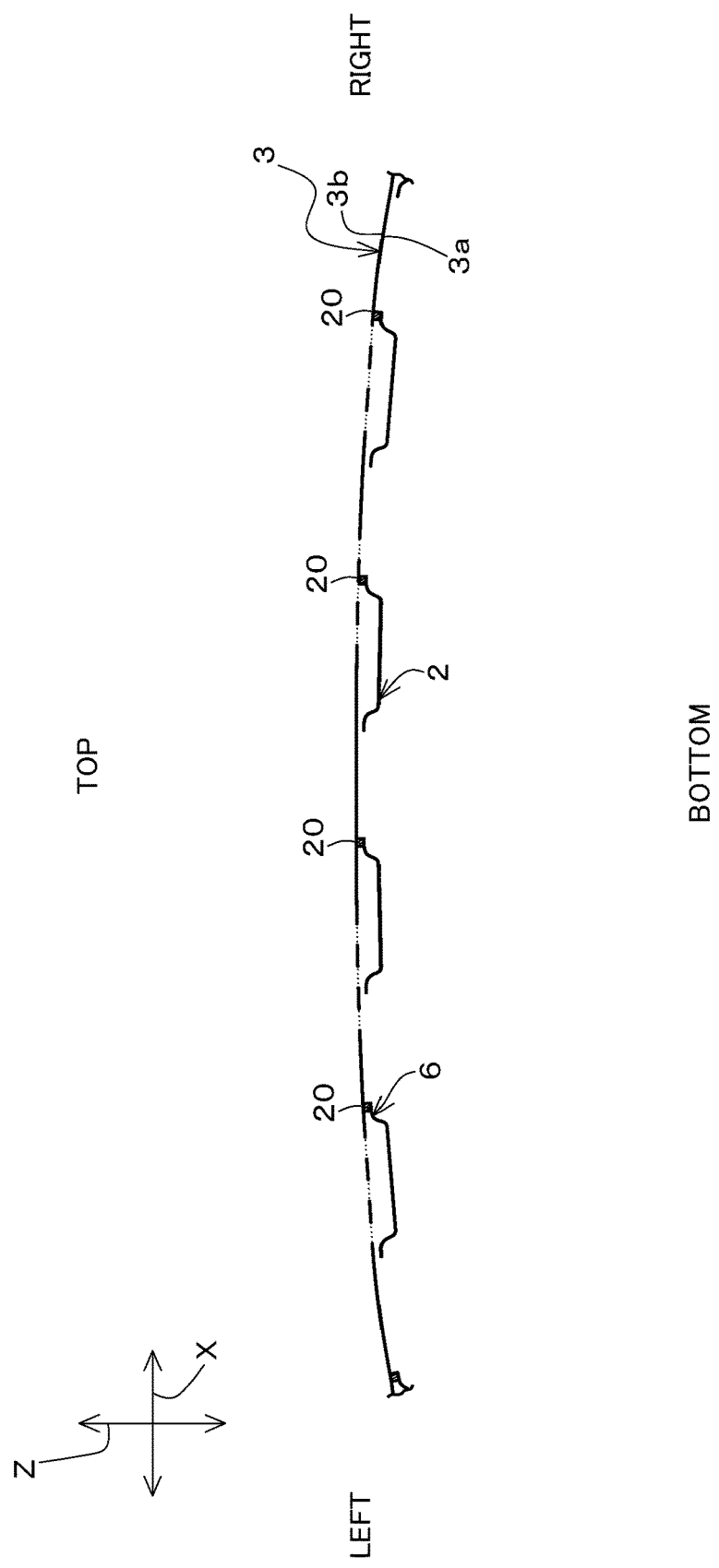
FIG. 4 is a cross-sectional view along a line IV-IV in FIG. 2, in which illustration of a portion that appears to the rear of the cross-section is omitted.

FIG. 1 is a schematic exploded perspective view of an automobile hood 1 according to one embodiment of the present invention, in which diagrammatic representation of a sealer 20 is omitted. FIG. 2 is a plan view of an inner panel 2 of the automobile hood 1. FIG. 3 is a schematic cross-sectional view along a line III-III in FIG. 2. FIG. 4 is a cross-sectional view along a line IV-IV in FIG. 2, in which illustration of a portion that appears to the rear of the cross-section is omitted. Note that, in FIG. 3 and FIG. 4, an outer panel 3 that does not appear in FIG. 2 is indicated by a chain double-dashed line that is a virtual line.

Figure 5:
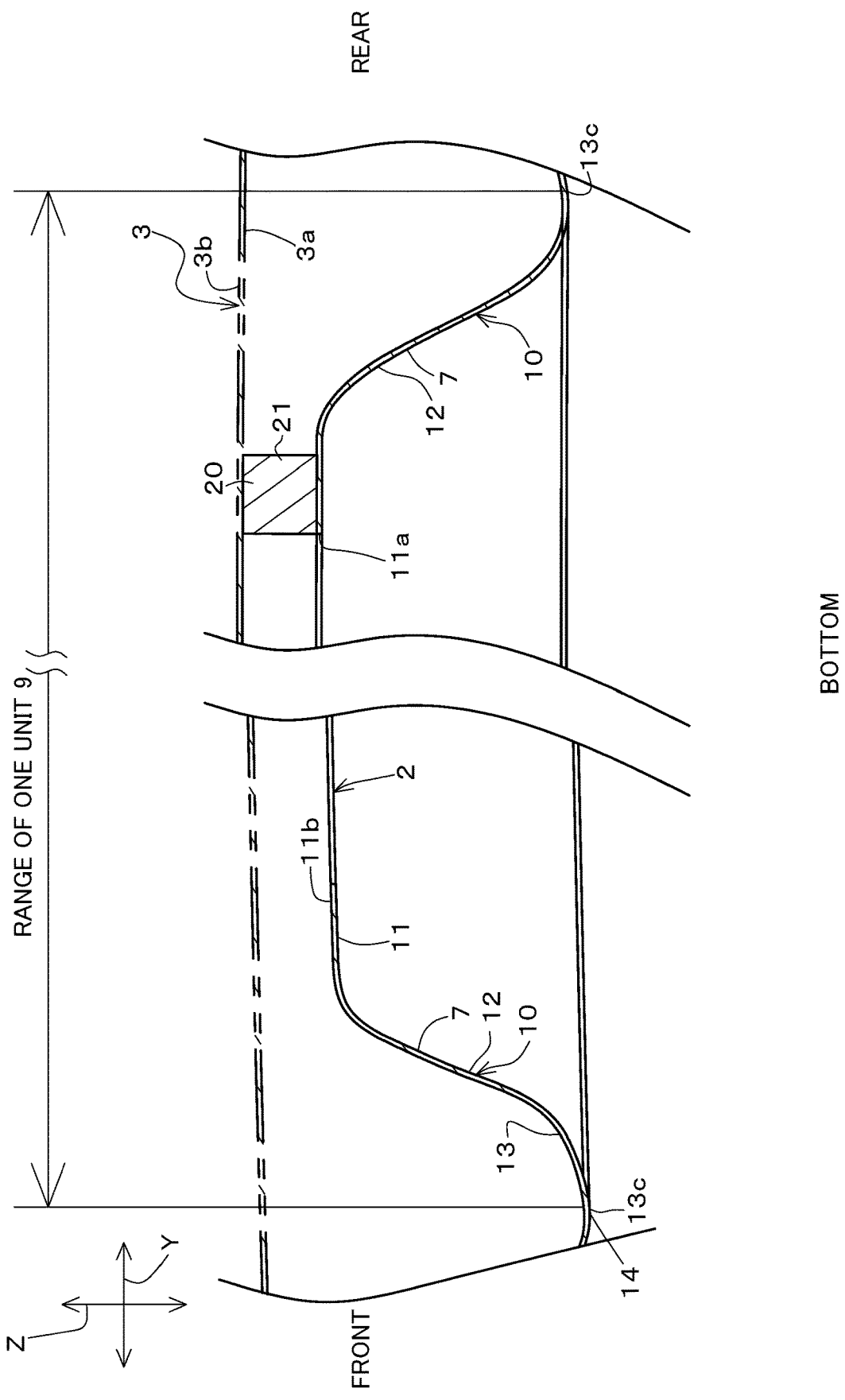
FIG. 5 is a view in which one part of FIG. 3 is enlarged.
Figure 6:
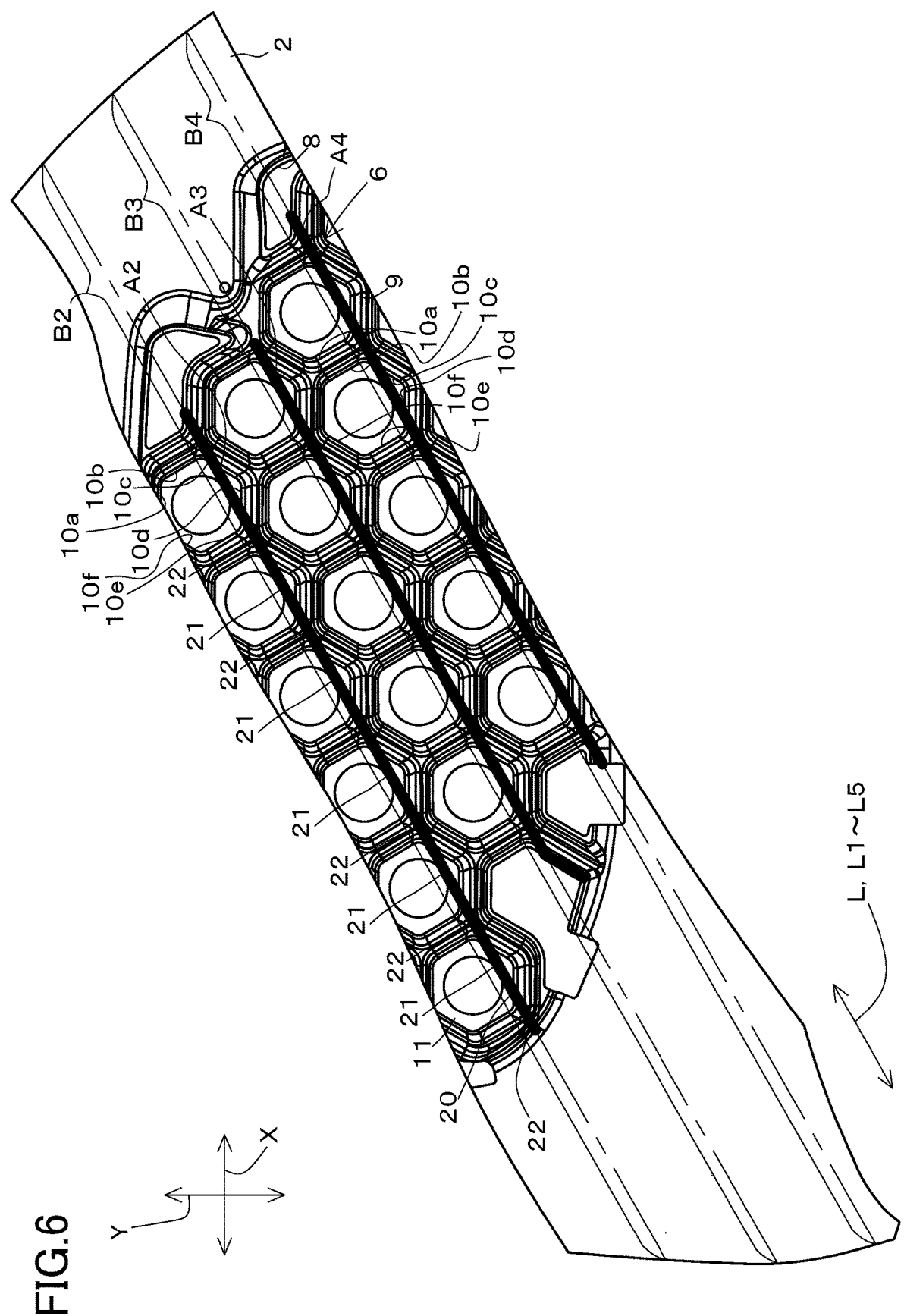
FIG. 6 is a plan view in which one part of the inner panel illustrated in FIG. 2 is enlarged.
Figure 7:
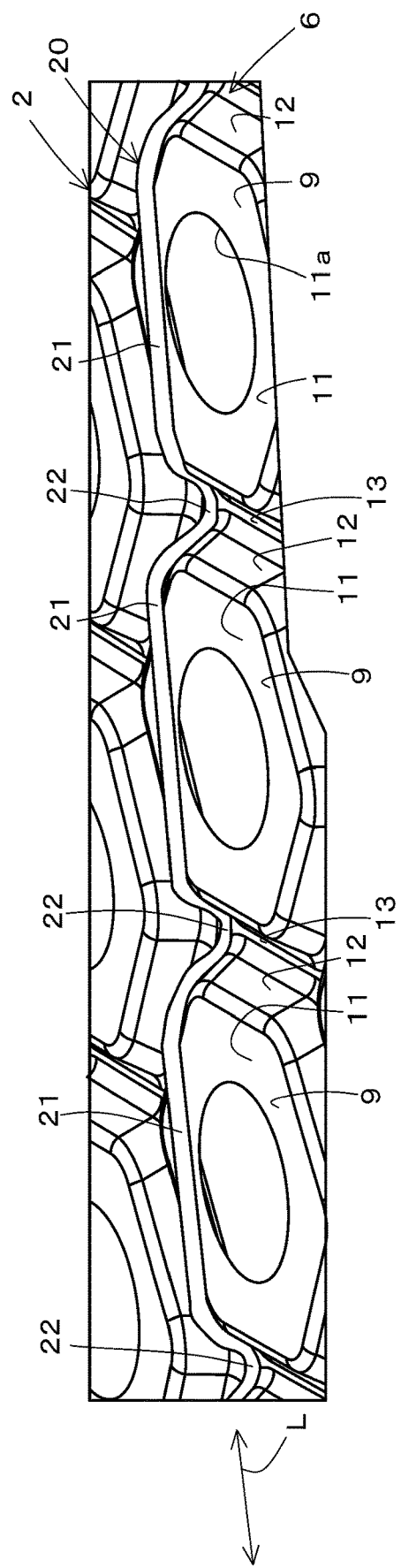
FIG. 7 is a perspective view in which one part of the inner panel is enlarged.

FIG. 5 is view in which one part of FIG. 3 is enlarged. FIG. 6 is a plan view in which one part of the inner panel 2 shown in FIG. 2 is enlarged. FIG. 7 is a perspective view in which one part of the inner panel 2 is enlarged. Hereinafter, unless otherwise noted, the embodiment will be described with reference to FIG. 1 to FIG. 7 as appropriate.

The automobile hood 1 is a front hood provided at the front part of an automobile, and is also called a "bonnet". An automobile in which the automobile hood 1 is provided is, for example, a passenger vehicle. A sedan-type passenger vehicle, a coupe-type passenger vehicle, a hatchback-type passenger vehicle, a minivan-type passenger vehicle, an SUV (Sport Utility Vehicle) type passenger vehicle and the like can be mentioned as examples of the passenger vehicle.

Note that, in the present description, the terms "front", "rear", "left", "right", and "upper" and "lower" are used taking a time when the automobile hood 1 is mounted to an automobile and the automobile hood 1 is closed as the basis. The term "front" refers to the direction in which the automobile advances. The term "rear" refers to the direction in which the automobile reverses. The term "right" refers to the turning direction of the automobile when the automobile which is advancing turns to the right. The term "left" refers to the turning direction of the automobile when the automobile which is advancing turns to the left. Further, in the present embodiment, the vehicle width direction of the automobile to which the automobile hood 1 is mounted is referred to as "width direction X". Further, the vehicle length direction of the automobile to which the automobile hood 1 is mounted is referred to as "longitudinal direction Y". Furthermore, the vehicle height direction of the automobile to which the automobile hood 1 is mounted is referred to as "height direction Z".

The automobile hood 1 has the inner panel 2, the outer panel 3 that is supported by the inner panel 2, sealers 20 provided between the inner panel 2 and the outer panel 3, joints 21 which are portions of the sealers 20 which contact the outer panel 3 and the inner panel 2 and which are portions that join the panels 2 and 3 to each other, and non-joint portions 22 as portions of the sealers 20 that are separated from either one of the inner panel 2 and the outer panel 3. Note that, in FIG. 2 and FIG. 6, the sealers 20 are illustrated using thick lines.

In the automobile hood 1, the outer panel 3 is a portion that constitutes a part of the outer surface of the automobile. The outer panel 3 is formed of, for example, a metal material such as a mild steel sheet or a high-tensile strength steel sheet. Examples of the high-tensile strength steel sheet that can be mentioned include steel sheets having a tensile strength of 340 MPa or more, for example, a steel sheet having a tensile strength of 590 MPa or more. The outer panel 3 is formed, for example, by subjecting a single steel sheet to press working or the like. In a case where the outer panel 3 is a steel sheet panel, the sheet thickness of the outer panel 3 is, for example, 0.25 mm to 0.80 mm. The outer panel 3 may be an aluminum alloy sheet. In a case where the outer panel 3 is an aluminum alloy panel, the sheet thickness of the outer panel 3 is, for example, 0.40 mm to 1.20 mm. There are no particular restrictions with regard to the shape of the outer panel 3. Note that, in the present embodiment, the outer panel 3 has a shape in which the central portion is upwardly convex in the height direction Z.

The inner panel 2 reinforces the outer panel 3 by being joined to an undersurface 3a of the outer panel 3 using the sealers 20. By this means, the inner panel 2 increases the panel rigidity of the outer panel 3. The inner panel 2 is formed, for example, of a metal material such as a steel sheet. The inner panel 2 is formed, for example, by subjecting a single steel sheet to press working. The inner panel 2 may be an integrally formed product, or may be formed by joining a plurality of members together. In the present embodiment, the inner panel 2 is an integrally formed product. In a case where the inner panel 2 is a steel sheet panel, the sheet thickness of the inner panel 2 (thickness of the steel sheet) is, for example, 0.25 mm to 0.80 mm. The sheet thickness of the inner panel 2 may be less than the sheet thickness of the outer panel 3, may be the same as the sheet thickness of the outer panel 3, or may be greater than the sheet thickness of the outer panel 3. Note that, the inner panel 2 may be an aluminum alloy sheet. In a case where the inner panel 2 is an aluminum alloy panel, the sheet thickness of the inner panel 2 is, for example, 0.40 mm to 1.20 mm.

The inner panel 2 has an outer circumferential portion 4 in which a contour forming portion 5 is provided, and an overhanging structure 6 arranged so as to be surrounded by the contour forming portion 5.

The outer circumferential portion 4 is an outer circumferential part of the inner panel 2. When the outer panel 3 closes the engine room, the outer circumferential portion 4 of the inner panel 2 is received by the automobile body (not illustrated) together with the outer circumferential portion of the outer panel 3. By this means, a load that acts on an upper face 3b of the outer panel 3 is received by the automobile body through the inner panel 2.

The contour forming portion 5 of the outer circumferential portion 4 is a three-dimensionally shaped portion formed at the outer circumferential part of the inner panel 2, and is a portion at which the bending rigidity is enhanced among the entire outer circumferential portion 4 of the inner panel 2. In the present embodiment, the contour forming portion 5 is formed over the entire area in the circumferential direction of the outer circumferential portion of the inner panel 2. Note that, the contour forming portion 5 may be formed only at one part in the circumferential direction of the outer circumferential portion 4 of the inner panel 2. The contour forming portion 5 includes a portion that rises and falls in the height direction Z when moved in the horizontal direction over the inner panel 2. The overhanging structure 6 is arranged so as to be surrounded by the contour forming portion 5.

The overhanging structure 6 has a three-dimensional structure which is provided in order to receive a load acting on the upper face 3b of the outer panel 3. The overhanging structure 6 has a configuration in which members that have a hat-shaped cross section (a V-shaped cross section or a U-shaped cross section) are combined.

The overhanging structure 6 has a plurality of incomplete units 8 that are adjacent to an inner circumferential edge portion 4a of the outer circumferential portion 4 and continuous with the outer circumferential portion 4, and a plurality of units 9.

The unit 9 which is adjacent to the outer circumferential portion 4 of the inner panel 2 is connected to the outer circumferential portion 4 directly or through the incomplete unit 8.

The incomplete unit 8 has a configuration equivalent to a configuration in which one portion of the unit 9 has been cut off along the circumferential direction of the polygonal (in the present embodiment, hexagonal) unit 9. The incomplete unit 8 has a side portion that is similar to a sub-unit 10 of the unit 9 that is described later. The side portion is continuous with the inner circumferential edge portion 4a of the outer circumferential portion 4.

Although a configuration may be adopted in which only one unit 9 is provided, in the present embodiment a plurality of the units 9 are provided. Each unit 9 is formed in a polygonal (in the present embodiment, hexagonal) annular shape in plan view in the height direction Z. Hereinafter, when simply the term "plan view" is used, it means a plan view in the height direction Z. By forming each unit 9 in a small annular shape (in the present embodiment, a polygonal annular shape), the inner panel 2 can be made lightweight and the inner panel 2 can also be provided with high rigidity.

In the present embodiment, each unit 9 is formed in the shape of a substantially regular hexagon with rounded corners. The term "regular hexagon" means a hexagon in which the lengths of the respective sides are equal and the interior angles are also a constant angle of 120 degrees. Further, in the present description, the term "substantially regular hexagon" refers to a hexagon that can be treated as a regular hexagon. The respective units 9 are formed so that the shape of each unit 9 is substantially the same. Note that, the term "substantially the same" in this case indicates that the configuration is the same except in the respect that the shape of each unit 9 is caused to match a shape which matches the curved shape of the outer panel 3.

Each unit 9 may also be formed in the shape of a hexagon that is other than a regular hexagon. Examples of a hexagon other than a regular hexagon that can be mentioned include a hexagon in which the lengths of the respective sides are not uniform, and a hexagon in which the interior angles are not uniform at 120 degrees. Examples of a hexagon in which the lengths of the respective sides are not uniform that can be mentioned include a hexagon in which the length of a front end side and the length of a rear end side are set to a predetermined first length, and which has four sides, lengths of which are each set to a predetermined second length that is different from the first length.

The overhanging structure 6 has a structure in which a plurality of the units 9 having a hexagonal annular shape are disposed in a close-packed arrangement. In this case, the term "close-packed" means that a plurality of the units 9 that are adjacent to each other are arranged without a gap therebetween. Specifically, each unit 9 is partitioned off from the other units 9 by unit boundaries 14. As illustrated in FIG. 5, a front end 13c (lower end) of a bottom portion 13 forms a boundary of the bottom portion 13 that includes the front end 13c, to thereby form the unit boundary 14. The unit boundary 14 is formed in a hexagonal shape in plan view. By having such a structure in which the units 9 are disposed in a close-packed hexagonal arrangement, the overhanging structure 6 can withstand loads in substantially the same manner from all directions including the height direction Z over the whole area in plan view.

In a case where flanges 11, described later, of the units 9 are disposed in a close-packed arrangement, preferably a plurality of the units 9 have the same shape. Further, the units 9 that have similar forms to each other and have differing shapes may be disposed in a close-packed arrangement. Note that, in the overhanging structure 6, the units 9 need not be disposed in a close-packed arrangement, and another portion may be formed between the units 9 and 9 that are adjacent.

In the present embodiment, the plurality of the units 9 are formed symmetrically in the width direction X as a whole. For example, in the present embodiment, three of the units 9 are arranged side by side in the front-to-rear direction at the center in the width direction X. Note that, there is no constraint on the direction of the units 9.

In the present embodiment, in the direction toward the right side from the aforementioned three units 9 arranged at the central position in the width direction X are provided, in the following order, four units 9 which are arranged side by side in the longitudinal direction Y, a further three units 9 which are arranged side by side in the longitudinal direction Y, a further two units 9 which are arranged side by side in the longitudinal direction Y, and a further two units 9 which are arranged side by side in the longitudinal direction Y. Furthermore, similarly to the foregoing arrangement, in the direction toward the left side from the aforementioned three units 9 arranged at the central position in the width direction X are provided, in the following order, four units 9 which are arranged side by side in the longitudinal direction Y, a further three units 9 which are arranged side by side in the longitudinal direction Y, a further two units 9 which are arranged side by side in the longitudinal direction Y, and a further two units 9 which are arranged side by side in the longitudinal direction Y. Thus, a plurality of the units 9 having the same shape are arranged in the longitudinal direction Y (front-rear direction) and the width direction X.

As illustrated clearly in FIG. 5 and FIG. 6, each of the units 9 has six of the sub-units 10 (10a to 10f). In the present embodiment, in each of the units 9, a front sub-unit 10a and a rear sub-unit 10d extend along the width direction X, respectively. Further, in each of the units 9, the remaining four sub-units 10 extend in a direction that inclines with respect to the longitudinal direction Y in plan view. The unit 9 that has a polygonal shape is formed by the plurality of sub-units 10 in this way.

Each of the sub-units 10 (10a to 10f) has a flange 11, an inclined wall 12 continuous with the flange 11, and the bottom portion 13 that is continuous with the inclined wall 12 and is separated from the flange 11.

The flange 11 is adjacent to the outer panel 3, and in the sub-unit 10, the flange 11 is a portion that is arranged closest to the outer panel 3. The flange 11 is a strip-shaped portion. In a single unit 9, outer circumferential portions of the flanges 11 of the six sub-units 10a to 10f form a hexagonal flange as a whole. Thus, in the present embodiment, in a single unit 9, the plurality of flanges 11 are formed in an annular shape as a whole. Note that, the outer circumferential portions of the flanges 11 of the six sub-units 10a to 10f may, as a whole, form a flange having a polygonal shape other than a hexagon, and may form a substantially circular flange, or may form a flange having a substantially oval shape. Further, inner end portions 11a of the six flanges 11 constitute an annular end portion which is centered on the center of the annular unit 9 as a whole. In the present embodiment, because the inner end portion 11a of each flange 11 is formed in an arc shape which is centered on the center of the unit 9, the inner end portions 11a of the six flanges 11 are formed in a circular shape as a whole.

Note that, the inner end portions 11a of the six flanges 11 may be formed in a polygonal shape as a whole, or may be formed in an elliptical shape as a whole. In the present embodiment, the plurality of flanges 11 in the plurality of units 9 are disposed in a close-packed arrangement. In an upper face 11b of the flange 11, a width to which a joint 21 can be applied is preferably 2 mm or more from the viewpoint that a sufficient amount of the joint 21 can be provided.

Each of the two end portions of the flange 11 in the longitudinal direction is formed in a curved shape in plan view, and smoothly connects with the flange 11 of an adjacent sub-unit 10. In the present embodiment, in each unit 9, the flanges 11 of at least some of the sub-units 10 are adhered to the joint 21 at the upper face 11b, and are adhered to the outer panel 3 through the joint 21. The inclined wall 12 extends downward from the flange 11.

The inclined wall 12 is disposed between the flange 11 and the bottom portion 13, and connects the flange 11 and the bottom portion 13. The inclined wall 12 extends from the flange 11 so as to separate from the outer panel 3. The inclined wall 12 is provided over the entire area in a longitudinal direction L of the sub-unit 10 in which the inclined wall 12 in question is provided. The inclined wall 12 is formed, for example, in a tapered shape that advances toward the central axis side (the inner end portion 11a side) of the unit 9 as it approaches the outer panel 3 side.

The flange 11 is continuous with the upper end of the inclined wall 12. The bottom portion 13 is continuous with the lower end of the inclined wall 12. In the unit 9, the bottom portion 13 is a portion that is farthest from the outer panel 3, and is separated from the flange 11. The bottom portion 13 is formed in a curved shape which is convex in the downward direction. The bottom portion 13 is provided over the entire area in the longitudinal direction of the sub-unit 10 in which the inclined wall 12 in question is provided. The flange 11, the inclined wall 12, and the bottom portion 13 are arranged in that order from the inner side to the outer side in the radial direction of the unit 9. The front end 13c of the bottom portion 13 in one unit 9 is integral with the front end 13c of the bottom portion 13 in another unit 9 that is adjacent thereto.

Next, the sealer 20 will be described more specifically while referring mainly to FIG. 2, FIG. 5 and FIG. 6. The sealer 20 is provided for joining the inner panel 2 and the outer panel 3. In the present embodiment, the sealer 20 is an adhesive. A mastic sealer (mastic adhesive) can be exemplified as the adhesive. A resin-based adhesive can be exemplified as the mastic sealer. The adhesive may have a property of being cured at normal temperature (for example, 20 degrees Celsius), or may have a property of being cured by undergoing a heating process or a drying process.

The sealer 20 is arranged so as to secure the bonding strength between the inner panel 2 and the outer panel 3 while achieving a reduction in the weight of the automobile hood 1. In the present embodiment, the sealer 20 is provided in each unit 9 of the inner panel 2. In the present embodiment, the width of the sealer 20 (the dimension of the sealer 20 in the direction orthogonal to the extending direction of the sealer 20 in plan view) is about 5 mm to 25 mm. A portion of the sealer 20 that is in contact with both of the inner panel 2 and the outer panel 3 constitutes a joint 21. Specifically, in the sealer 20, a portion that is actually in contact with both of the inner panel 2 and the outer panel 3 is the joint 21 that joins these panels 2 and 3 to each other.

The joint 21 joins the upper face 11b of the flange 11 and the undersurface 3a of the outer panel 3. Thus, by the flange 11 of the inner panel 2 that is a flange which projects to the outer panel 3 side being joined to the outer panel 3 through the joint 21, the inner panel 2 can support the outer panel 3 with high rigidity.

At least one part of the sealer 20 (in the present embodiment, all of the sealer 20) is arranged in a linear sealer region A. The term "linear sealer region A" refers to a region in which the sealer 20 is continuously provided and extends in a linear shape. The term "linear shape" in this case is not limited to the case of a true straight line, and also includes a case where the sealer 20 meanders or curves within a range of about three times the width of the sealer 20 in a direction orthogonal to the longitudinal direction of the sealer 20 in plan view. At least three (in the present embodiment, nine) of the linear sealer regions A are provided. In the present embodiment, the linear sealer regions A (A1 to A9) are provided. In the present embodiment, a place where the sealer 20 is provided is a sealer region (linear sealer region A).

In each of the linear sealer regions A1 to A9, the direction in which the relevant linear sealer region A1 to A9 extends is defined as a longitudinal direction L (L1 to L9). The longitudinal direction L is a direction on a straight line connecting the center of one end and the center of the other end of the sealer 20 in each linear sealer region A. In the present embodiment, the respective longitudinal directions L1 to L6 of the linear sealer regions A1 to A6 are directions that extend from the lower left to the upper right in plan view, the longitudinal direction L7 of the linear sealer region A7 is a direction along the width direction X, and the respective longitudinal directions L8 and L9 of the linear sealer regions A8 and A9 are directions from the lower left to the upper right. Although in FIG. 2 the longitudinal directions L1 to L6 are indicated collectively, they are different directions to each other.

In the present embodiment, the linear sealer region A1 is arranged at the left end of the linear sealer regions A1 to A9. Further, the linear sealer regions A1 to A6 which are parallel to each other are arranged from the left side to the right side. The linear sealer region A7 is continuous with the front end of the linear sealer region A1, and in addition, the linear sealer regions A7 and A8 are continuous with each other. Further, the linear sealer region A9 is continuous with the rear end of the linear sealer region A3.

Each of the linear sealer regions A1 to A9 is provided within the overhanging structure 6. The linear sealer regions A1 to A5 extend over a plurality of the units 9. Specifically, the linear sealer region A1 extends over four of the units 9 that are arranged in series from the lower left to the upper right. The linear sealer region A2 extends over six of the units 9 that are arranged in series from the lower left to the upper right. The linear sealer region A3 extends over five of the units 9 that are arranged in series from the lower left to the upper right. The linear sealer region A4 extends over five of the units 9 that are arranged in series from the lower left to the upper right. The linear sealer region A5 extends over four of the units 9 that are arranged in series from the lower left to the upper right. The linear sealer region A6 is arranged in one of the units 9. Note that, the linear sealer regions A7 and A8 are arranged in the incomplete unit 8 at the front end. Further, the linear sealer region A9 is arranged in the incomplete unit 8 on the rear end side.

In the present embodiment, in each unit 9, only one linear sealer region A is provided. Specifically, in a direction orthogonal to the longitudinal direction L of the linear sealer regions A1 to A6, the linear sealer region A is arranged only on one of a pair of end portions of each unit 9. In other words, in the linear sealer regions A1 to A6 as at least one of the plurality of linear sealer regions, all the joints 21 are arranged at places that are offset from the center (the center point of the circle of the inner end portions 11a) of the flanges 11. By means of the above configuration relating to the sealer 20, the total weight of the sealer 20 in the automobile hood 1 can be reduced.

As mentioned above, each of the linear sealer regions A1 to A5 extends over a plurality of the units 9. Therefore, each of the sealers 20 of the linear sealer regions A1 to A5 extends while rising and falling in the height direction Z. With regard to the linear sealer region A6 also, the sealer 20 extends while rising and falling in the height direction Z. Further, in the sealer 20 of each of the linear sealer regions A1 to A6, a portion that is mounted on the flange 11 constitutes the joint 21. Specifically, the joints 21 are arranged in each of the linear sealer regions A1 to A6. In each of the linear sealer regions A1 to A5, the joints 21 are intermittently arranged in the longitudinal direction L. In the sealer 20 of each of the linear sealer regions A1 to A5, a place that is mounted on the flange 11 constitutes the joint 21 as described above. Specifically, the respective sealers 20 of the linear sealer regions A1 to A5 form respective joints 21 at the flanges 11 of a plurality of the units 9. On the other hand, in the sealer 20 of each of the linear sealer regions A1 to A6, a place arranged on the inclined wall 12 or the bottom portion 13 constitutes a non-joint portion 22 which does not join the inner panel 2 and the outer panel 3 to each other. In each of the linear sealer regions A1 to A6, the joints 21 and the non-joint portions 22 are alternately arranged in the corresponding longitudinal direction L1 to L6. In each of the linear sealer regions A1 to A5, approximately 70% of the region is the joints 21, and the remaining about 30% of the region is the non-joint portions 22. In the linear sealer regions A7 to A9, a portion of the sealer 20 that is mounted on the flange 11 of the incomplete unit 8 constitutes the joint 21. Thus, in the present embodiment, the joint 21 is formed in each of the linear sealer regions A1 to A9. Note that, it suffices that the joint 21 is formed in at least three longest linear sealer regions A2, A4 and A3 among the plurality of linear sealer regions A1 to A9.

In the present embodiment, at least three of the linear sealer regions A are provided at intervals in at least one of the longitudinal direction Y as the front-rear direction of the automobile hood 1 and the width direction X. Specifically, in the vicinity of the center of the automobile hood 1 in the width direction X, the linear sealer region A2 is arranged diagonally to the rear of the linear sealer regions A1, A7, and A8. In addition, diagonally to the rear of the linear sealer region A2, the linear sealer regions A3, A4, and A5 are arranged in that order toward the rear. The linear sealer region A9 is arranged to the rear of the linear sealer region A3. Further, the linear sealer region A6 is arranged on the diagonally rear side of the linear sealer region A5. Thus, in the present embodiment, at least three of the linear sealer regions A are provided at intervals in both of the longitudinal direction Y and the width direction X.

In the present embodiment, a region of the inner panel 2 which includes one linear sealer region A and in which both ends in the longitudinal direction L reach the outer circumferential edge of the inner panel 2 is defined as an end-to-end region B. In other words, a region of the automobile hood 1 which includes one linear sealer region A and which is present along the longitudinal direction L is defined as an end-to-end region B. It can also be said that the end-to-end region B is a region of the inner panel 2 which includes the linear sealer region A and which is aligned in the longitudinal direction L with the linear sealer region A (which includes the linear sealer region A and regions aligned with the linear sealer region A).

More specifically, end-to-end regions B1 to B9 that include the linear sealer regions A1 to A9, respectively, are defined. In plan view, the end-to-end region B1 is a region of the inner panel 2 that includes the linear sealer region A1 and in which both ends in the longitudinal direction L of the linear sealer region A1 reach the outer circumferential edge of the inner panel 2. In the present embodiment, a pair of end portions B1a and B1b of the end-to-end region B1 are located at the left rear edge and the front edge of the inner panel 2, respectively. Similarly, in plan view, the end-to-end regions B2 to B4 are regions of the inner panel 2 that include the corresponding linear sealer regions A2 to A4 and in which both ends in the corresponding longitudinal directions L2 to L4 of the linear sealer regions A2 to A4 reach the outer circumferential edge of the inner panel 2. In the present embodiment, the respective pairs of end portions B2a and B2b, B3a and B3b, and B4a and B4b of the end-to-end regions B2 to B4 are located at the left rear edge and the front edge of the inner panel 2, respectively. Further, in plan view, the end-to-end regions B5 and B6 are regions of the inner panel 2 that include the corresponding linear sealer regions A5 and A6 and in which both ends in the corresponding longitudinal directions L5 and L6 of the linear sealer regions A5 and A6 reach the outer circumferential edge of the inner panel 2. In the present embodiment, the respective pairs of end portions B5a and B5b, and B6a and B6b of the end-to-end regions B5 and B6 are located at the rear edge and the right edge of the inner panel 2, respectively.

In the present embodiment, three longest linear sealer regions A in lengths in the longitudinal direction L among the linear sealer regions A1 to A9 are, in order of longest length, the linear sealer regions A2, A4, and A3. In plan view, the lengths of the three longest linear sealer regions A2, A4, and A3 among the plurality of linear sealer regions A are 40% or more of the lengths of the end-to-end regions B2, B4 and B3 to which the linear sealer regions A2, A4 and A3 themselves belong, respectively. Specifically, in plan view, in these longest linear sealer regions A2, A4, and A3, the proportion of the respective lengths with respect to the lengths of the corresponding end-to-end regions B2, B4 and B3 in the corresponding longitudinal directions L2 to L4 is 40% or more respectively. More specifically, in plan view, in the longitudinal direction L2, the proportion of the length of the linear sealer region A2 with respect to the length between the end portions B2a and B2b of the end-to-end region B2 is 40% or more. Further, in plan view, in the longitudinal direction L3, the proportion of the length of the linear sealer region A3 with respect to the length between the end portions B3a and B3b of the end-to-end region B3 is 40% or more. Further, in plan view, in the longitudinal direction L4, the proportion of the length of the linear sealer region A4 with respect to the length between the end portions B4a and B4b of the end-to-end region B4 is 40% or more.

The grounds for setting the respective lengths of the three longest linear sealer regions A2, A4, and A3 among the plurality of linear sealer regions A to 40% or more of the respective lengths of the corresponding end-to-end regions B2, B4 and B3 to which the linear sealer regions A2, A4 and A3 themselves belong in this way is as follows. Specifically, in the automobile hood 1, for reasons pertaining to the design and the design space, in a region up to a maximum of about 30% of an outer circumferential side portion of the automobile hood 1, (1) the rigidity of the outer panel 3 is high and it is not necessary for the region to be stiffened using the inner panel 2. Alternatively, (2) it is difficult to set the linear sealer region A because it is difficult to stiffen the region using the inner panel 2 due to interference with other components. Therefore, it is possible to set the length of the sealer region A to (100%−2×30%=) 40% or more of the length of the linear sealer region B. By forming these regions A2, A4 and A3 in a long linear shape and also providing the joints 21 in each of these regions A2, A4 and A3, the efficiency of the operation for joining the inner panel 2 and the outer panel 3 can be increased while making the joining strength with which the inner panel 2 and the outer panel 3 are joined to each other sufficiently high.

In the present embodiment, the lengths of the linear sealer regions A other than the three longest linear sealer regions A in lengths in the longitudinal direction L among the linear sealer regions A1 to A9 are not particularly defined except for the point that the lengths are shorter than the lengths of the three longest linear sealer regions A2, A4 and A3.

Further, in the present embodiment, the end-to-end regions B2, B4 and B3 of the aforementioned three longest linear sealer regions A2, A4 and A3 among the plurality of linear sealer regions A1 to A9 are arranged so that intersection of the end-to-end regions B2, B4 and B3 with each other is avoided (the end-to-end regions B2, B4 and B3 are separated). In the present embodiment, the end-to-end regions B2, B4 and B3 are arranged in a linear shape extending from the lower left to the upper right in plan view, and are substantially parallel to each other. Hence, the end-to-end regions B2, B4 and B3 do not intersect with each other in the region surrounded by the outer circumferential edge of the inner panel 2.

In the present embodiment, in each unit 9, the joints 21 of the linear sealer regions A1 to A6 are arranged over two flanges 11 and 11 that are adjacent to each other. Specifically, in each unit 9, the joints 21 are arranged over the flanges 11 of the sub-units 10c and 10d. Further, only one linear sealer region A of the plurality of linear sealer regions A is passed over one unit 9.

Further, in the present embodiment, in plan view, the joints 21 are arranged in a well-balanced manner in the automobile hood 1. Specifically, the joints 21 are arranged on both sides of the center of the automobile hood 1 in the width direction X, and are scattered in a region of at least 40% or more of the total width of the automobile hood 1. Similarly, the joints 21 are arranged on both sides of the center of the automobile hood 1 in the longitudinal direction Y, and are scattered in a region of at least 40% or more of the total length of the automobile hood 1.

When assembling the automobile hood 1 having the configuration described above, first, the inner panel 2, the outer panel 3, and the sealer 20 are prepared. Next, the inner panel 2 or the outer panel 3 is held by a jig or the like as an application target. Next, a robot arm applies a sealer nozzle to the application target so as to apply the sealer 20 to form the arrangement illustrated in FIG. 2. Next, a robot arm or the like is used to fit together the application target and the inner panel 2 or outer panel 3 that is different from the application target. By this means, some of the sealer 20 comes into contact with both of the inner panel 2 and the outer panel 3 to form the joints 21. Thereafter, for example, the outer circumferential edge portion of the outer panel 3 is subjected to hemming to complete the automobile hood 1.

As described above, according to the present embodiment, the three longest linear sealer regions A2, A4 and A3 among the linear sealer regions A1 to A9 are each a length that is 40% or more of the length of the corresponding end-to-end regions B2, B4 and B3 to which the linear sealer regions A2, A4 and A3 themselves belong, respectively, and the joints 21 are formed in these linear sealer regions A2, A4 and A3. Further, the three end-to-end regions B2, B4 and B3 that include the aforementioned three longest linear sealer regions A2, A4 and A3 do not intersect with each other within the region surrounded by the outer circumferential edge of the inner panel 2. With this configuration, an operation to apply the sealer 20 can be performed by moving the nozzle that applies the sealer 20 along a simple path. Hence, during assembly of the automobile hood 1, the time required for the application process can be made shorter through the efficient application of the sealer 20. In particular, since the sealer 20 can be applied in long linear shapes, the movement of the robot arm when applying the sealer 20 using the robot arm can be made simpler, and the life of the robot arm can be extended through a reduction in the load on the robot arm in comparison to a case where the robot arm performs complicated movements. In addition, by making the lengths of the longest three linear sealer regions A2, A4 and A3 long and also arranging at least these three linear sealer regions A2, A4 and A3 at intervals in the longitudinal direction Y, the length of the joints 21 can be sufficiently secured and these three linear sealer regions A2, A4, and A3 can be arranged in a well-balanced manner so as not to intersect with each other. As a result, the joining strength between the inner panel 2 and the outer panel 3 can be sufficiently secured using the joints 21. Based on the above described configuration, for the automobile hood 1, the efficiency of the operation for joining the inner panel 2 and the outer panel 3 can be increased while making the joining strength with which the inner panel 2 and the outer panel 3 are joined to each other sufficiently high.

Further, according to the present embodiment, in the linear sealer regions A1 to A5, the joints 21 are intermittently arranged in the corresponding longitudinal directions L1 to L5. According to this configuration, while quickly applying the sealer 20 in straight lines, the joints 21 can be arranged at places that are suitable for joining the inner panel 2 and the outer panel 3.

In particular, in the present embodiment, in each of the three longest linear sealer regions A2, A4 and A3, the joints 21 and the non-joint portions 22 are alternately arranged in the longitudinal directions L2, L4 and L3, respectively. According to this configuration, while simplifying the movement of the robot arm when applying the sealer 20 using the robot arm, the joints 21 can be applied in a well-balanced manner to a wider area in the automobile hood 1. Hence, the efficiency of the operation for joining the inner panel 2 and the outer panel 3 can be further increased while making the joining strength with which the inner panel 2 and the outer panel 3 are joined to each other sufficiently high.

Further, according to the present embodiment, the plurality of linear sealer regions A1 to A6 are arranged in parallel with each other. According to this configuration, the plurality of linear sealer regions A1 to A6 can be collectively formed by, for example, moving a plurality of (three) nozzles linearly two times. Hence, the operation to apply the sealer 20 can be performed more quickly.

Further, according to the present embodiment, the joints 21 of the linear sealer regions A1 to A5 are provided on flanges 11 of a plurality of the units 9. According to this configuration, by performing the operation of forming one linear sealer region A which can be completed in a short time, the joints 21 can be collectively provided on the flanges 11 of a plurality of the units 9. In particular, in the present embodiment, a plurality of the units 9 that have the same shape are arranged in the longitudinal direction Y and the width direction X of the automobile hood 1. In the case of such an arrangement of the units 9, if the configuration is one in which the long linear sealer regions A1 to A5 are provided, the efficiency of applying the sealer 20 can be made very high, and assembly of the automobile hood 1 can be completed in a shorter time through shortening of the time required to perform the sealer application operation.

Note that, in the embodiment described above, the sealer 20 has been described by taking as an example a form in which the sealer 20 extends from the lower left to the upper right. However, the form of the sealer 20 may be different from the form described in the above example. For example, the sealer 20 may be arranged symmetrically in the width direction X with respect to the arrangement shown in FIGS. 2 and 6, or may be arranged symmetrically in the longitudinal direction Y.

An embodiment of the present invention has been described above. However, the present invention is not limited to the above embodiment. In the present invention, various changes are possible within the scope of the accompanying claims. Note that, hereunder, configurations that are different from the above embodiment are mainly described, and components that are the like as in above embodiment are denoted by the like reference symbols and a detailed description thereof is omitted.

[Modification in which Reinforcing Sealers are Provided in Embodiment]

Figure 8:
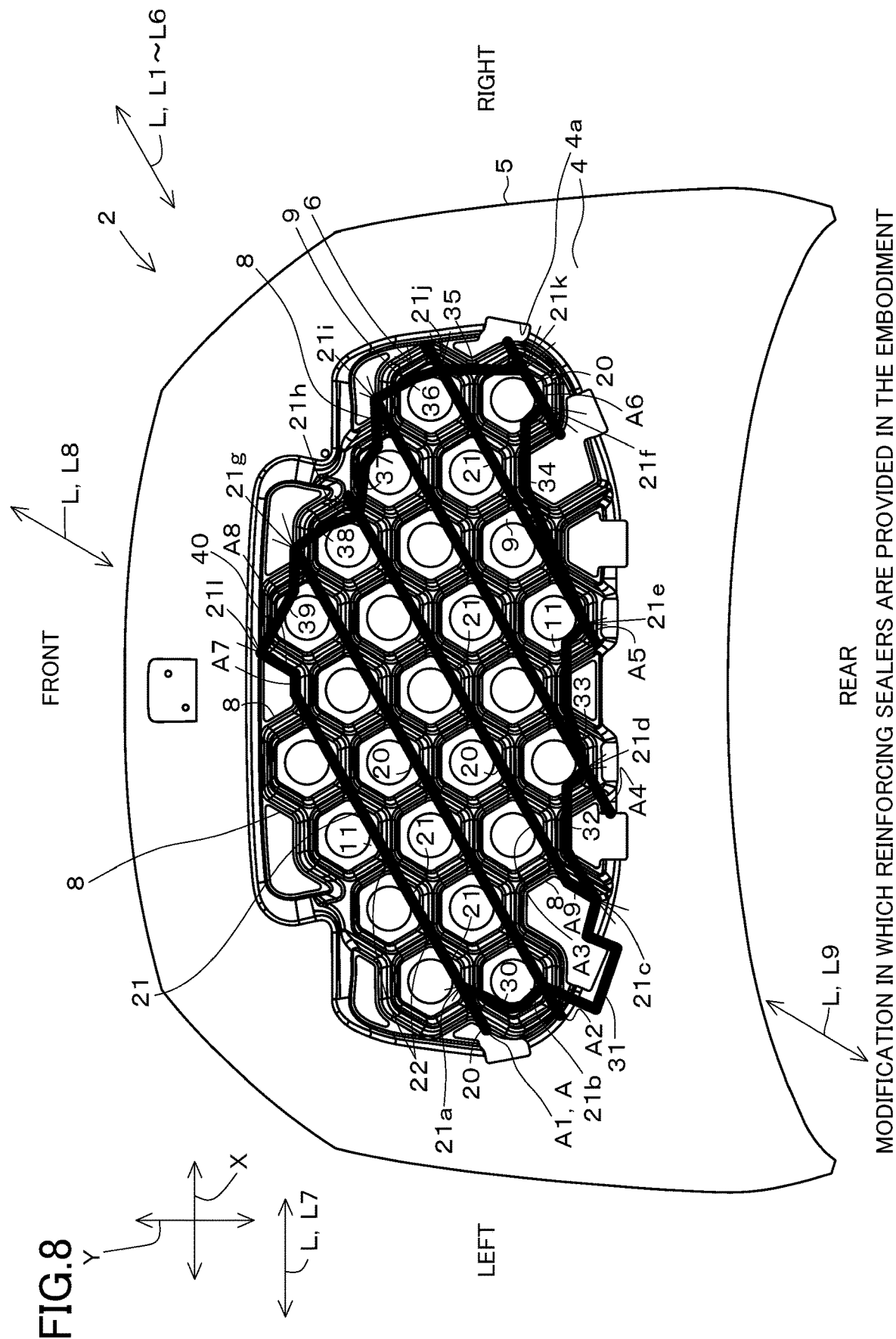
FIG. 8 is a plan view of an inner panel of an automobile hood in a modification in which reinforcing sealers are provided in the embodiment.

In the embodiment described above, the left rear end (one end) of the linear sealer regions A1, A2, A4 to A6, and A9 and the right front end (other end) of the linear sealer regions A2 to A6, and A8 are each provided as a free end as an end portion that is independent from other sealers 20. However, a different arrangement may also be adopted. FIG. 8 is a plan view of the inner panel 2 of the automobile hood 1 in a modification in which reinforcing sealers are provided in the embodiment.

In this modification, in addition to the configuration of the embodiment described above, reinforcing sealers 30 to 39 are additionally provided. The reinforcing sealers 30 to 39 are provided to connect together end portions of joints 21 of the linear sealer regions A1 to A6, A8, and A9 that are end portions which are not in contact with another linear sealer region.

Specifically, the linear sealer region A1 has an end portion 21a that is disposed on the leftmost side in an end portion joint 21 arranged at an endmost portion on one side (the left side) in the longitudinal direction L1 of the linear sealer region A1 among the plurality of joints 21. Similarly, the linear sealer regions A2, A4, A5, A6, and A9 have end portions 21b to 21f that are respectively disposed on the leftmost side in an end portion joint 21 arranged at an endmost portion on one side (the left side) in the longitudinal direction L of the corresponding linear sealer region A2, A4, A5, A6 or A9.

Further, the linear sealer region A2 has an end portion 21g that is disposed on the rightmost side in an end portion joint 21 that is arranged at an endmost portion on the other side (the right side) in the longitudinal direction L2 of the linear sealer region A2 among the plurality of joints 21. Similarly, the linear sealer regions A3 to A6, and A8 have end portions 21h to 21l that are respectively disposed on the rightmost side in an end portion joint 21 arranged at an endmost portion on the other side (the right side) in the longitudinal direction L of the corresponding linear sealer region A3, A4, A5, A6, or A8.

In this modification, the reinforcing sealers 30 to 39 connect together the end portions 21a to 21l of the end portion joints 21 of the plurality of linear sealer regions A1 to A6, A8 and A9 with longitudinal directions L different from each other. Further, in the present embodiment, by passing over at least one of the flanges 11, the respective reinforcing sealers 30 to 39 are joined to both of the inner panel 2 and the outer panel 3 to form the joints 21. Specifically, in the reinforcing sealers 30 to 39, a place that is disposed on the flange 11 is the joint 21.

More specifically, the reinforcing sealer 30 connects together the end portions 21a and 21b of the end portion joints 21 of the linear sealer regions A1 and A2 that are adjacent. One part of the reinforcing sealer 30 is arranged on the flange 11 between the linear sealer regions A1 and A2, and this portion forms the joint 21.

The reinforcing sealer 31 connects together the end portions 21b and 21c of the end portion joints 21 of the linear sealer regions A2 and A9 that are adjacent. One part of the reinforcing sealer 31 is arranged on the flange 11 of the incomplete unit 8 between the linear sealer regions A2 and A9, and this portion forms the joint 21.

The reinforcing sealer 32 connects together the end portions 21c and 21d of the end portion joints 21 of the linear sealer regions A9 and A4 that are adjacent. One part of the reinforcing sealer 32 is arranged on the flange 11 of the incomplete unit 8 and the flange 11 of the unit 9 between the linear sealer regions A9 and A4, and this portion forms the joint 21.

The reinforcing sealer 33 connects together the end portions 21d and 21e of the end portion joints 21 of the linear sealer regions A4 and A5 that are adjacent. One part of the reinforcing sealer 33 is arranged on the flange 11 of the incomplete unit 8 and the flange 11 of the unit 9 between the linear sealer regions A4 and A5, and this portion forms the joint 21.

The reinforcing sealer 34 connects together the end portions 21e and 21f of the end portion joints 21 of the linear sealer regions A5 and A6 that are adjacent. One part of the reinforcing sealer 34 is arranged on the flange 11 of the incomplete unit 8 and the flange 11 of the unit 9 between the linear sealer regions A5 and A6, and this portion forms the joint 21.

The reinforcing sealer 35 connects together end portions 21k and 21j of the end portion joints 21 of the linear sealer regions A6 and A5 that are adjacent. One part of the reinforcing sealer 35 is arranged on the flange 11 of the unit 9 between the linear sealer regions A6 and A5, and this portion forms the joint 21.

The reinforcing sealer 36 connects together end portions 21j and 21i of the end portion joints 21 of the linear sealer regions A5 and A4 that are adjacent. One part of the reinforcing sealer 36 is arranged on the flange 11 of the incomplete unit 8 and the flange 11 of the unit 9 between the linear sealer regions A5 and A4, and this portion forms the joint 21.

The reinforcing sealer 37 connects together end portions 21i and 21h of the end portion joints 21 of the linear sealer regions A4 and A3 that are adjacent. One part of the reinforcing sealer 35 is arranged on the flange 11 of the unit 9 between the linear sealer regions A4 and A3, and this portion forms the joint 21.

The reinforcing sealer 38 connects together end portions 21h and 21g of the end portion joints 21 of the linear sealer regions A3 and A2 that are adjacent. One part of the reinforcing sealer 38 is arranged on the flange 11 of the incomplete unit 8 and the flange 11 of the unit 9 between the linear sealer regions A3 and A2, and this portion forms the joint 21.

The reinforcing sealer 39 connects together end portions 21g and 21l of the end portion joints 21 of the linear sealer regions A2 and A8 that are adjacent. One part of the reinforcing sealer 39 is arranged on the flange 11 of the incomplete unit 8 and the flange 11 of the unit 9 between the linear sealer regions A2 and A8, and this portion forms the joint 21.

In the present embodiment, preferably each of the reinforcing sealers 30 to 39 extends in a direction that intersects with each of the longitudinal directions L of the corresponding adjacent two linear sealer regions A.

According to the configuration described above, the reinforcing sealers 30 to 39 cooperate with the sealers 20 of a plurality of linear sealer regions to form an annular sealer 40. The outer circumference of the annular sealer 40 is formed by the linear sealer region A1, the reinforcing sealers 30 to 34, the linear sealer region A6, the reinforcing sealers 35 to 39, and the linear sealer regions A8 and A7.

As described above, according to the present modification, the reinforcing sealers 30 to 39 are provided that connect together the end portions 21a to 21l of the end portion joints 21 of the plurality of linear sealer regions A1 to A6, A8, and A9 with longitudinal directions L different from each other. According to this configuration, at each of the end portions 21a to 21l, a state is not entered in which the joints 21 are abruptly discontinued at the end portions 21a to 21l. If a state is entered in which the joints 21 are abruptly discontinued at the end portions 21a to 21l, a change in the strength of the outer panel 3 in the vicinity of the end portions 21a to 21l will be large. In the case of such a state, there is room for improvement with respect to securing sufficient dent resistance of the outer panel 3 in the vicinity of the end portions 21a to 21l. By providing the reinforcing sealers 30 to 39 that connect together the end portions 21a to 21l, a change in the strength of the outer panel 3 in the vicinity of the end portions 21a to 21l can be made small, and the dent resistance of the outer panel 3 in the vicinity of the end portions 21a to 21l can be further increased. By this means, the dent resistance of the outer panel 3 as a whole can be further increased.

Further, according to the present embodiment, the reinforcing sealers 30 to 39 cooperate with the linear sealer regions A1, A6, A7, and A8 to form the annular sealer 40. According to this configuration, high dent resistance can be secured at the outer circumferential side portion of the outer panel 3. Further, by applying the reinforcing sealers 30 to 39 in an annular shape, the time required for applying the reinforcing sealers 30 to 39 can be further shortened.

Note that, the respective reinforcing sealers 30 to 39 need not be directly connected to the adjacent linear sealer regions A which the reinforcing sealers 30 to 39 connect, and there may be a gap of about several tens of mm or less therebetween. Further, a part of the annular sealer 40 may be interrupted. For example, in at least one of the reinforcing sealers 30 to 39, a sealer having a dotted-line shape may be formed by a midway portion of the sealer being interrupted. The sealer having a dotted-line shape may be a sealer consisting of two sections, or may be a sealer consisting of three or more sections.

<First Modification>

Figure 9:
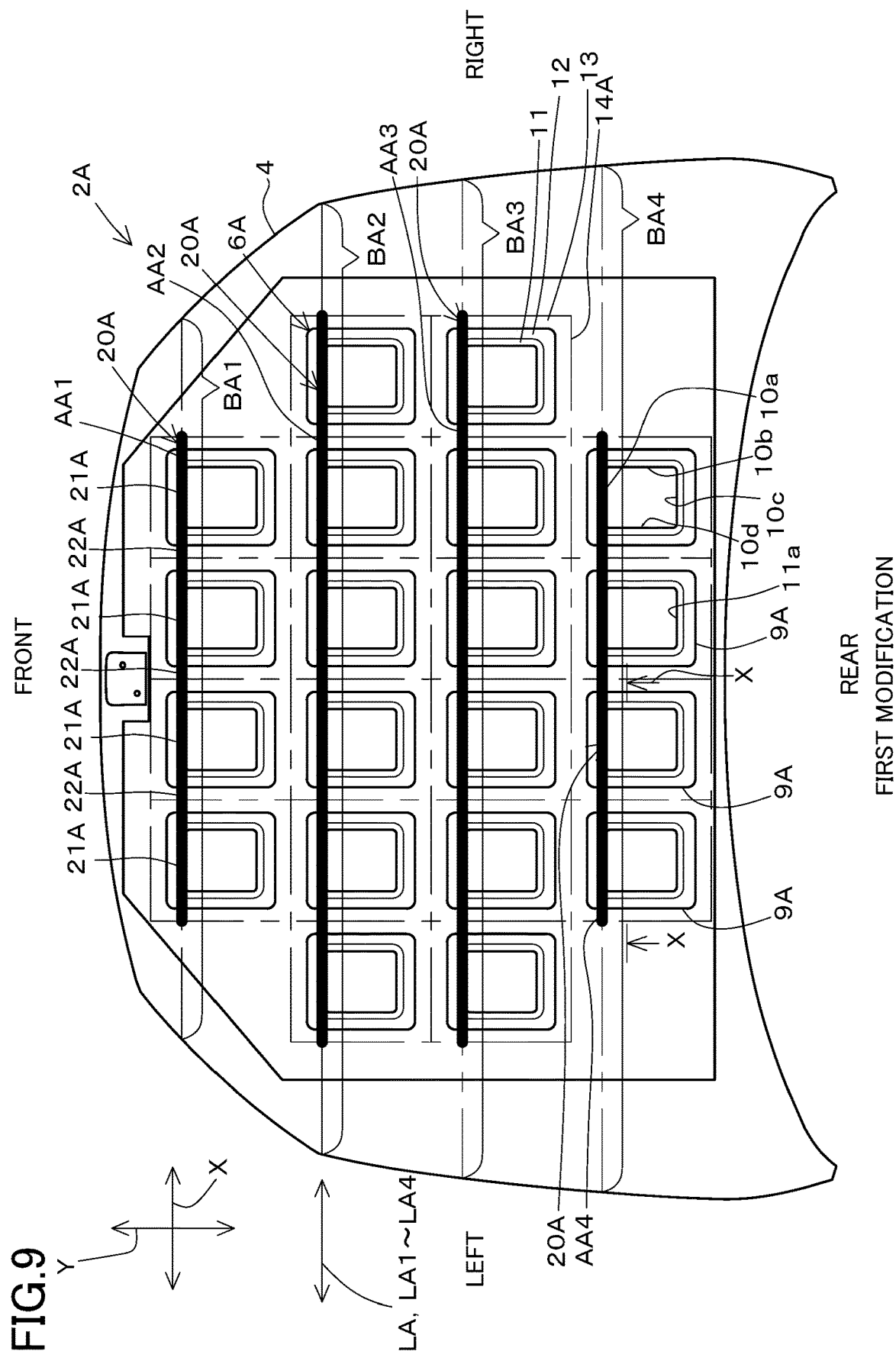
FIG. 9 is a schematic plan view of an inner panel and sealers pertaining to a first modification.
Figure 10:
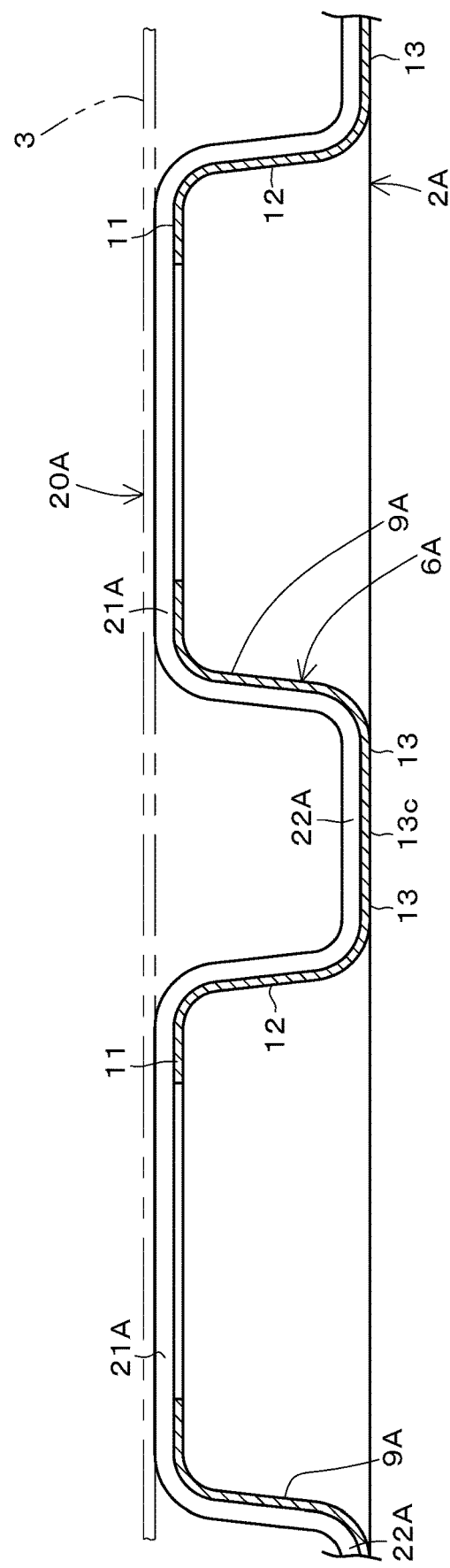
FIG. 10 is a cross-sectional view along a line X-X in FIG. 9.

In the above embodiment and modification, the unit 9 is described using an example of the unit 9 that has a hexagonal shape. However, the unit need not have a hexagonal shape. For example, as illustrated in FIG. 9 to FIG. 10, instead of the overhanging structure 6, an overhanging structure 6A (overhanging structure with a small frame structure) that includes a plurality of units 9A formed in a quadrangular shape as a polygonal shape may be provided. FIG. 9 is a schematic plan view of an inner panel 2A and a sealer 20A pertaining to a first modification. FIG. 10 is a cross-sectional view along a line X-X in FIG. 9. The overhanging structure 6A has a configuration in which the units 9A are disposed in a close-packed arrangement.

In the present first modification, in plan view, each unit 9A is formed in a rectangular shape with rounded corners. Each unit 9A is formed in substantially the same shape. Note that in this case, the term "substantially the same" indicates that the configurations are the same except that the shape of each unit 9A is made to conform to a shape that is matched to the curved shape of the outer panel 3. Each unit 9A may be formed in a quadrangle other than a rectangle, such as a square. Note that, in the overhanging structure 6A, the units 9A need not be disposed in a close-packed arrangement, and another portion may be formed between the units 9A and 9A that are adjacent.

Each of the units 9A has four of the sub-units 10 (10a to 10d). In the present embodiment, in each unit 9A, the sub-unit 10a and the sub-unit 10c are arranged separated from each other in the longitudinal direction Y. Further, in each unit 9A, the sub-unit 10b and the sub-unit 10d are arranged separated from each other in the width direction X.

Each of the sub-units 10 (10a to 10d) has the flange 11, the inclined wall 12 continuous with the flange 11, and the bottom portion 13 that is continuous with the inclined wall 12 and is separated from the flange 11.

The plurality of flanges 11 of each unit 9A are formed in an annular shape as a whole. In a single unit 9A, the front ends 13c of the bottom portions 13 of the four sub-units 10 form a single unit boundary 14A having a square shape as a whole. At the unit boundary 14A, the units 9A and 9A that are adjacent are continuous with each other. In the present embodiment, the units 9A are arranged in a grid pattern. Further, the units 9A are arranged in a plurality of rows (for example, four rows) in the longitudinal direction Y. In the present embodiment, the number of units 9A in each of the two unit rows near the center in the longitudinal direction Y is greater than the number of units 9A in the unit row of units 9A on the front end side, and is also greater than the number of units 9A in the unit row of units 9A on the rear end side.

Next, the sealer 20A will be more specifically described. The sealer 20A is provided for joining the inner panel 2A and the outer panel 3 to each other.

The sealer 20A is provided in each unit 9A of the inner panel 2A. A portion of the sealer 20A that is in contact with both of the inner panel 2A and the outer panel 3 constitutes a joint 21A. Specifically, in the sealer 20A, portions that are actually in contact with both of the inner panel 2A and the outer panel 3 are joints 21A that join these panels 2A and 3 to each other.

At least one part (in the present embodiment, all) of the sealer 20A is arranged in a linear sealer region AA. At least three (in the present embodiment, four) linear sealer regions AA are provided. In the present embodiment, linear sealer regions AA (AA1 to AA4) are provided.

In each of the linear sealer regions AA1 to AA4, the direction in which the relevant linear sealer regions AA1 to AA4 extend is defined as a longitudinal direction LA (LA1 to LA4). The longitudinal direction LA is a direction along a straight line connecting the center of one end and the center of the other end of the sealer 20A in each of the linear sealer regions AA1 to AA4. In the present embodiment, the longitudinal direction LA of each of the linear sealer regions AA1 to AA4 is along the width direction X.

In this first modification, the linear sealer regions AA1 to AA4 are arranged in that order from the row of units 9A on the front end side, and are arranged in parallel with each other. The linear sealer regions AA1 to AA4 are provided at intervals in the longitudinal direction Y.

Each of the linear sealer regions AA1 to AA4 is provided within the overhanging structure 6A. Each of the linear sealer regions AA1 to AA4 extends over a plurality of the units 9A. Specifically, each of the linear sealer regions AA1 to AA4 extends over all of the units 9A in a single row aligned in the width direction X.

Further, in the present first modification, only one linear sealer region A among the plurality of linear sealer regions AA is provided in each unit 9A. By this means, the total weight of the sealer 20A in the automobile hood can be reduced.

As described above, each of the linear sealer regions AA1 to AA4 extends over a plurality of units 9A. Therefore, each of the sealers 20A of the linear sealer regions AA1 to AA4 extends while rising and falling in the height direction Z. Further, in the sealer 20A of each of the linear sealer regions AA1 to AA4, a portion that is mounted on a flange 11 constitutes a joint 21A. Specifically, the joints 21A are arranged in each of the linear sealer regions AA1 to AA4. The joint 21A is a portion that joins the panels 2A and 3 to each other. In each of the linear sealer regions AA1 to AA4, the joints 21A are intermittently arranged in the longitudinal direction L. Specifically, the joints 21A of the sealer 20A of the linear sealer regions AA1 to AA4 are provided on the flanges 11 of a plurality of the units 9A. On the other hand, in the sealer 20A of each of the linear sealer regions AA1 to AA4, a place that is in contact with the inclined wall 12 or the bottom portion 13 constitutes a non-joint portion 22A which does not join the inner panel 2A and the outer panel 3 to each other. The non-joint portion 22A is a portion of the sealer 20A that is separated from either one of the inner panel 2A and the outer panel 3. In each of the linear sealer regions AA1 to AA4, the joints 21A and the non-joint portions 22A are alternately arranged. In the present modification, all the joints 21A of each of the linear sealer regions AA1 to AA4 are arranged at places that are offset from the center (centroid) of the flanges 11 of each unit 9A. Further, the sealer 20A of each of the linear sealer regions AA1 to AA4 forms respective joints 21A on the flange 11 of a plurality of the units 9A.

In the present embodiment, a region of the inner panel 2A which includes one linear sealer region AA and in which both ends in the longitudinal direction LA reach the outer circumferential edge of the inner panel 2A is defined as an end-to-end region BA.

More specifically, end-to-end regions BA1 to BA4 that include the linear sealer regions AA1 to AA4, respectively, are defined. In plan view, each of the end-to-end regions BA1 to BA4 is a region of the inner panel 2A that includes the corresponding linear sealer region AA1, AA2, AA3 or AA4, and in which both ends in the longitudinal direction LA of the relevant linear sealer region AA1, AA2, AA3 or AA4 reach the outer circumferential edge of the inner panel 2A.

In the present first modification, three longest linear sealer regions in lengths in the longitudinal direction L among the linear sealer regions AA1 to AA4 are, in order of longest length, the linear sealer regions AA2, AA3 and AA4. In plan view, each of the three longest linear sealer regions AA2, AA3 and AA4 among the plurality of linear sealer regions AA1 to AA4 has a length that is 40% or more of the length of the corresponding end-to-end region BA2, BA3 or BA4 to which the relevant linear sealer region AA2, AA3 or AA4 itself belongs. In other words, in plan view, in each of these longest linear sealer regions AA2, AA3 and AA4, the proportion of the length with respect to the length of the corresponding end-to-end region BA2, BA3 or BA4 in the corresponding longitudinal direction LA is 40% or more. The joints 21A are formed in each of the linear sealer regions AA2, AA3 and AA4.

Further, in the present first modification, the end-to-end regions BA2, BA3 and BA4 of the aforementioned three longest linear sealer regions AA2, AA3 and AA4 among the plurality of linear sealer regions AA1 to AA4 do not intersect with each other within a region surrounded by the outer circumferential edge of the inner panel 2A.

In the present embodiment, the joints 21A of the linear sealer regions AA1 to AA4 are arranged on the flange 11 that is at the front end in each unit 9A. Further, only one linear sealer region AA is passed over one unit 9A.

In the first modification configured as described above also, the same operational advantages as the operational advantages of the above embodiment can be exhibited.

<Example in which Reinforcing Sealers are Provided in First Modification>

FIG. 11 is a plan view of the inner panel 2A of the automobile hood 1 in a modification in which reinforcing sealers are provided in the first modification.

In this modification, in addition to the configuration of the first modification described above, reinforcing sealers 30A to 35A are additionally provided. The reinforcing sealers 30A to 35A are provided to, among the joints 21A of the linear sealer regions AA1 to AA4, connect together end portions which are not in contact with another linear sealer region.

Specifically, the linear sealer region AA1 has an end portion $21aA$ that is disposed on the leftmost side in an end portion joint 21A arranged at an endmost portion on one side (the left side) in the longitudinal direction LA1 of the linear sealer region AA1 among the plurality of joints 21A. Similarly, the linear sealer regions AA2 to AA4 have end portions $21bA$ to $21dA$, respectively, each of which is disposed on the leftmost side in an end portion joint 21A arranged at an endmost portion on one side (the left side) in the longitudinal direction LA of the corresponding linear sealer region AA2, AA3 or AA4.

Further, the linear sealer regions AA1 to AA4 have end portions $21eA$ to $21hA$, respectively, each of which is disposed on the rightmost side in an end portion joint 21A that, among the plurality of joints 21A, is arranged at an endmost portion on the other side (right side) in the longitudinal direction L of the corresponding linear sealer region AA1, AA2, AA3 or AA4.

In this modification, the reinforcing sealers 30A to 35A connect together the end portions $21aA$ to $21hA$ of the end portion joints 21A of the plurality of linear sealer regions AA1 to AA4 with longitudinal directions L different from each other. Further, in the present modification, by passing over at least one of the flanges 11, the respective reinforcing sealers 30A to 35A are joined to both of the inner panel 2A and the outer panel 3 to form the joints 21A. Specifically, in the reinforcing sealers 30A to 35A, a place that is disposed on the flange 11 is the joint 21A.

More specifically, the reinforcing sealer 30A connects together the end portions $21aA$ and $21bA$ of the end portion joints 21 of the linear sealer regions AA1 and AA2 that are adjacent. One part of the reinforcing sealer 30A is arranged on the flange 11 of the unit 9 between the linear sealer regions AA1 and AA2, and this portion forms the joint 21A.

The reinforcing sealer 31A connects together the end portions 21bA and 21cA of the end portion joints 21A of the linear sealer regions AA2 and AA3 that are adjacent. One part of the reinforcing sealer 31A is arranged on the flange 11 of the unit 9 between the linear sealer regions AA2 and AA3, and this portion forms the joint 21A.

The reinforcing sealer 32A connects together the end portions 21cA and 21dA of the end portion joints 21A of the linear sealer regions AA3 and AA4 that are adjacent. One part of the reinforcing sealer 32A is arranged on the flange 11 of the unit 9A between the linear sealer regions AA3 and AA4, and this portion forms the joint 21A.

The reinforcing sealer 33A connects together the end portions 21hA and 21gA of the end portion joints 21 of the linear sealer regions AA4 and AA3 that are adjacent. One part of the reinforcing sealer 33A is arranged on the flange 11 of the unit 9A between the linear sealer regions AA4 and AA2, and this portion forms the joint 21A.

The reinforcing sealer 34A connects together the end portions 21gA and 21fA of the end portion joints 21A of the linear sealer regions AA3 and AA2 that are adjacent. One part of the reinforcing sealer 34A is arranged on the flange 11 of the unit 9A between the linear sealer regions AA3 and AA2, and this portion forms the joint 21A.

The reinforcing sealer 35A connects together the end portions 21fA and 21eA of the end portion joints 21A of the linear sealer regions AA2 and AA1 that are adjacent. One part of the reinforcing sealer 35A is arranged on the flange 11 of the unit 9A between the linear sealer regions AA2 and AA1, and this portion forms the joint 21A.

In the present modification, preferably each of the reinforcing sealers 30A to 35A extends in a direction that intersects with each of the longitudinal directions LA of the corresponding adjacent two linear sealer regions AA.

According to the configuration described above, the reinforcing sealers 30A to 35A cooperate with the sealers 20A of a plurality of linear sealer regions to form an annular sealer 40A. The outer circumference of the annular sealer 40A is formed by the linear sealer region AA1, the reinforcing sealers 30A to 32A, the linear sealer region AA4, and the reinforcing sealers 33A to 35A.

As described above, according to the present modification, the reinforcing sealers 30A to 35A are provided that connect together the end portions 21aA to 21hA of the end portion joints 21A of the plurality of linear sealer regions AA1 to AA4 with longitudinal directions L different from each other. According to this configuration, at each of the end portions 21aA to 21hA, a state is not entered in which the joints 21A are abruptly discontinued at the end portions 21aA to 21hA. If a state is entered in which the joints 21A are abruptly discontinued at the end portions 21aA to 21hA, a change in the strength of the outer panel 3 in the vicinity of the end portions 21aA to 21hA will be large. In the case of such a state, there is room for improvement with respect to securing sufficient dent resistance of the outer panel 3 in the vicinity of the end portions 21aA to 21hA. By providing the reinforcing sealers 30A to 35A that connect together the end portions 21aA to 21hA, a change in the strength of the outer panel 3 in the vicinity of the end portions 21aA to 21hA can be made small, and the dent resistance of the outer panel 3 in the vicinity of the end portions 21aA to 21hA can be further increased. By this means, the dent resistance of the outer panel 3 as a whole can be further increased.

Further, according to the present modification, the reinforcing sealers 30A to 35A cooperate with the linear sealer regions AA1 and AA4 to form the annular sealer 40A. According to this configuration, high dent resistance can be secured at the outer circumferential side portion of the outer panel 3. Further, by applying the reinforcing sealers 30A to 35A in an annular shape, the time required for applying the reinforcing sealers 30A to 35A can be further shortened.

Note that, the respective reinforcing sealers 30A to 35A need not be directly connected to the adjacent linear sealer regions A which the reinforcing sealers 30A to 35A connect, and there may be a gap of about several tens of mm or less therebetween. Further, a part of the annular sealer 40A may be interrupted. For example, in at least one of the reinforcing sealers 30A to 35A, a sealer having a dotted-line shape may be formed by a midway portion of the sealer being interrupted. The sealer having a dotted-line shape may be a sealer consisting of two sections, or may be a sealer consisting of three or more sections.

Note that, in the first modification, a form in which the linear sealer regions AA1 to AA4 including the three longest linear sealer regions AA2 to AA4 are long in the width direction X has been described as an example. However, a different form may also be adopted.

<Modification of First Modification>

For example, as illustrated in FIG. 12 that shows a modification of the first modification, three longest linear sealer regions AA1' to AA4' may extend along the longitudinal direction Y. In this case, the linear sealer regions AA1' to AA4' are provided at intervals in the width direction X.

<Example in which Reinforcing Sealers are Provided in Modification of First Modification>

FIG. 13 is a plan view of the inner panel 2A of the automobile hood 1 in an example where reinforcing sealers are provided in the modification of the first modification.

In this modification, in addition to the configuration of the modification illustrated in FIG. 12, reinforcing sealers 30A' to 35A' are additionally provided. The reinforcing sealers 30A' to 35A' are provided in order to, in the joints 21A' of the linear sealer regions AA1' to AA4', connect together end portions which are not in contact with another linear sealer region.

Specifically, the linear sealer regions AA1' to AA4' have end portions 21aA' to 21dA', respectively, each of which is disposed on the frontmost side in an end portion joint 21A' arranged at an endmost portion on one side (front side) in the longitudinal direction LA of the corresponding linear sealer region AA1', AA2', AA3' or AA4'.

Further, the linear sealer regions AA1' to AA4' have end portions 21eA' to 21hA', respectively, each of which is disposed on the rearmost side in an end portion joint 21A' that, among a plurality of the joints 21A', is arranged at an endmost portion on the other side (rear side) in the longitudinal direction LA of the corresponding linear sealer region AA1', AA2', AA3' or AA4'.

In this modification, the reinforcing sealers 30A' to 35A' connect together the end portions 21aA' to 21hA' of the end portion joints 21A' of the plurality of linear sealer regions AA1' to AA4' with longitudinal directions LA different from each other. Further, in the present modification, by passing over at least one of the flanges 11, the respective reinforcing sealers 30A' to 35A' are joined to both of the inner panel 2A and the outer panel 3 to form the joints 21A'. Specifically, in the reinforcing sealers 30A' to 35A', a place that is disposed on the flange 11 is the joint 21A'.

More specifically, the reinforcing sealer 30A' connects together the end portions 21aA' and 21bA' of the linear sealer regions AA1' and AA2' that are adjacent. One part of the reinforcing sealer 30A' is arranged on the flange 11 of the unit 9A between the linear sealer regions AA1' and AA2', and this portion forms the joint 21A'.

The reinforcing sealer 31A' connects together the end portions 21bA' and 21cA' of the linear sealer regions AA2' and AA3' that are adjacent. One part of the reinforcing sealer 31A' is arranged on the flange 11 of the unit 9A between the linear sealer regions AA2' and AA3', and this portion forms the joint 21A'.

The reinforcing sealer 32A' connects together the end portions 21cA' and 21dA' of the linear sealer regions AA3' and AA4' that are adjacent. One part of the reinforcing sealer 32A' is arranged on the flange 11 of the unit 9A between the linear sealer regions AA3' and AA4', and this portion forms the joint 21A'.

The reinforcing sealer 33A' connects together the end portions 21hA' and 21gA' of the linear sealer regions AA4' and AA3' that are adjacent. One part of the reinforcing sealer 33A' is arranged on the flange 11 of the unit 9A between the linear sealer regions AA4' and AA3', and this portion forms the joint 21A'.

The reinforcing sealer 34A' connects together the end portions 21gA' and 21fA' of the linear sealer regions AA3' and AA2' that are adjacent. One part of the reinforcing sealer 34A' is arranged on the flange 11 of the unit 9A between the linear sealer regions AA3' and AA2', and this portion forms the joint 21A'.

The reinforcing sealer 35A' connects together the end portions 21fA' and 21eA' of the linear sealer regions AA2' and AA1' that are adjacent. One part of the reinforcing sealer 35A' is arranged on the flange 11 of the unit 9A between the linear sealer regions AA2' and AA1', and this portion forms the joint 21A'.

In the present modification, preferably each of the reinforcing sealers 30A' to 35A' extends in a direction that intersects with each of the longitudinal directions LA of the corresponding adjacent two linear sealer regions AA'.

According to the configuration described above, the reinforcing sealers 30A' to 35A' cooperate with the linear sealer regions AA1' and AA4' to form an annular sealer 40A'. The outer circumference of the annular sealer 40A' is formed by the linear sealer region AA1', the reinforcing sealers 30A' to 32A', the linear sealer region AA4', and the reinforcing sealers 33A' to 35A'.

<Second Modification>

FIG. 14 is a plan view of an inner panel 2B according to a second modification of the present invention. Referring to FIG. 14, the second modification differs from the embodiment in the respect that the inner panel 2B is used instead of the inner panel 2.

The inner panel 2B has the outer circumferential portion 4 in which the contour forming portion 5 is provided, and an overhanging structure 6B (overhanging structure with a small frame structure) arranged so as to be surrounded by the contour forming portion 5.

The overhanging structure 6B has a three-dimensional structure which is provided in order to receive a load acting on the upper face 3b of the outer panel 3 (not illustrated). The overhanging structure 6B is formed to have a hat-shaped cross section (a V-shaped cross section or a U-shaped cross section).

The overhanging structure 6B is formed in a symmetrical shape in the width direction X. The overhanging structure 6B has a flange 11B, and an outer circumferential inclined wall 12B continuous with the flange 11B.

The flange 11B is adjacent to the outer panel 3, and is a portion of the inner panel 2B that is arranged closest to the outer panel 3. In the present second modification, the flange 11B is a substantially flat planar portion. The term "substantially flat" includes the meaning of a shape that is curved to an extent that follows the inclined shape of the undersurface 3a of the outer panel 3, and refers to a degree of flatness of an extent that can be regarded as flat from the viewpoint of applying a sealer 20B with a nozzle. The outer circumferential inclined wall 12B is continuous with an outer circumferential portion of the flange 11B, and the outer circumferential inclined wall 12B extends downward from the flange 11B.

The outer circumferential inclined wall 12B is arranged between the flange 11B and the outer circumferential portion 4, and connects the flange 11B and the outer circumferential portion 4. The outer circumferential inclined wall 12B is an inclined wall having an annular shape that is provided over the entire area of an outer circumferential edge portion of the flange 11B. The flange 11B is continuous with the upper end of the outer circumferential inclined wall 12B.

A plurality of through-holes 15 are formed in the flange 11B of the overhanging structure 6B (unit) having the configuration described above. The through-holes 15 are formed for the purpose of making the inner panel 2B light in weight. Each through-hole 15 is formed, for example, in a rectangular shape. In the present second modification, the through-holes 15 are arranged in a grid pattern. Further, the through-holes 15 are arranged in a plurality of rows (for example, four rows) in the longitudinal direction Y. In the present embodiment, the number of through-holes 15 in each of the two rows near the center in the longitudinal direction Y is greater than the number of through-holes 15 in the through-hole row on the front end side, and is also greater than the number of through-holes 15 in the through-hole row on the rear end side. Thus, a plurality of the through-holes 15 having the same shape are arranged in the longitudinal direction Y and the width direction X.

The sealer 20B is provided on the flange 11B of the inner panel 2B. A portion of the sealer 20 that is in contact with both of the inner panel 2B and the outer panel 3 constitutes a joint 21B. Specifically, in the sealer 20B, a portion that is actually in contact with both of the inner panel 2B and the outer panel 3 is the joint 21B that joins these panels 2B and 3 to each other. In the present embodiment, because the sealer 20B is provided on the flat flange 11B, all of the sealer 20B is the joint 21B.

At least one part (in the present second modification, all) of the sealer 20B is arranged in a linear sealer region AB. At least three (in the present second modification, 23) linear sealer regions AB are provided. In the present second modification, a large number of linear sealer regions AB (AB1 to AB23) are provided.

In each of the linear sealer regions AB1 to AB23, the direction in which the relevant linear sealer region AB1 to AB23 extends in a straight line is defined as a longitudinal direction LB. The longitudinal direction LB is a direction along a straight line connecting the center of one end and the center of the other end of the sealer 20B in each of the linear sealer regions AB1 to AB23. In the present second modification, the longitudinal direction L of each of the linear sealer regions AB1 to AB3 is along the width direction X, and the longitudinal direction L of each of the linear sealer regions AB4 to AB23 is along the longitudinal direction Y.

In the present second modification, the linear sealer regions AB1 to AB3 are arranged in parallel in the longitudinal direction Y. The through-holes 15 are provided between the linear sealer regions AB1 and AB2. Similarly, the through-holes 15 are provided between the linear sealer regions AB2 and AB3. The linear sealer regions AB4 to AB7 are adjacent to the through-holes 15 provided on the front side, at positions adjacent to the linear sealer region AB1 on the front side. The linear sealer regions AB8 to AB13 are arranged between the linear sealer regions AB1 and AB2, and are adjacent to the through-holes 15 in the second row from the front. The linear sealer regions AB14 to AB19 are arranged between the linear sealer regions AB2 and AB3, and are adjacent to the through-holes 15 in the third row from the front. The linear sealer regions AB20 to AB23 are adjacent to the linear sealer region AB3, and are adjacent to the through-holes 15 in the row on the rearmost side.

In each of the linear sealer regions AB1 to AB23, the joint 21B extends continuously along the longitudinal direction L without passing through a non-joint portion.

In the present second modification, a region of the inner panel 2B which includes one linear sealer region AB and in which both ends in the longitudinal direction LB reach the outer circumferential edge of the inner panel 2B is defined as an end-to-end region BB. The term "end-to-end region BB" refers to a region of the inner panel 2B which includes a linear sealer region AB and which is aligned in the longitudinal direction L with the linear sealer region AB.

More specifically, end-to-end regions BB1 to BB23 that include the linear sealer regions AB1 to AB23, respectively, are defined. Note that, reference characters denoting the end-to-end regions BB4 to BB23 are omitted in the drawings. In plan view, each of the end-to-end regions BB1 to BB3 is a region of the inner panel 2B that includes the corresponding linear sealer region AB1, AB2 or AB3, and in which both ends in the longitudinal direction LB of the relevant linear sealer region AB1, AB2 or AB3 reach the outer circumference of the inner panel 2B. In the present second modification, the pair of end portions of each of the end-to-end regions BB1 to BB3 are positioned at the left edge and the right edge, respectively, of an automobile hood 1B. On the other hand, in the present second modification, the pair of end portions of each of the end-to-end regions BB4 to BB23 are positioned at the front edge and the rear edge, respectively, of the automobile hood 1B.

In the present second modification, three longest linear sealer regions in the longitudinal direction LB among the linear sealer regions AB1 to AB23 are the linear sealer regions AB1 to AB3. The linear sealer regions AB1 to AB3 are provided at intervals in the longitudinal direction Y. In plan view, each of the three longest linear sealer regions AB1 to AB3 among the plurality of linear sealer regions AB1 to AB23 has a length that is 40% or more of the length of the corresponding end-to-end region BB1, BB2 or BB3 to which the relevant linear sealer region AB1, AB2 or AB3 itself belongs. In other words, in plan view, in each of these longest linear sealer regions AB1, AB2 and AB3, the proportion of the length with respect to the length of the corresponding end-to-end region BB1, BB2 or BB3 in the corresponding longitudinal direction LB1, LB2 or LB3 is 40% or more. More specifically, in plan view, the proportion of the length of the linear sealer region AB1 with respect to the length of the end-to-end region BB1 is 40% or more, and a similar situation applies with respect to the linear sealer regions AB2 and AB3.

In the present second modification, the lengths of the linear sealer regions AB other than the three longest linear sealer regions AB in lengths in the longitudinal direction LB among the linear sealer regions AB1 to AB3 are not particularly defined except for the point that the lengths are shorter than the lengths of the linear sealer regions AB1 to AB3.

Further, the end-to-end regions BB1 to BB3 of the aforementioned three longest linear sealer regions AB1 to AB3 each extend in the width direction X, and do not intersect with each other within the region surrounded by the outer circumferential edge of the inner panel 2B.

In such a configuration also, similarly to the embodiment, in the automobile hood 1B, the efficiency of the operation for joining the inner panel 2B and the outer panel 3 can be further increased while making the joining strength with which the inner panel 2B and the outer panel 3 are joined to each other sufficiently high.

Further, according to the present second modification, in each of the linear sealer regions AB1 to AB23, and in particular in the long linear sealer regions AB1 to AB3, the joint 21B extends continuously along the corresponding longitudinal direction LB. According to this configuration, the joining strength between the inner panel 2B and the outer panel 3 can be sufficiently secured with a smaller amount of the sealer 20B.

Note that, in the second modification, the shape of the through-hole 15 may be a polygonal shape other than a rectangular shape, may be a circular shape, or may be an elliptical shape.

<Example in which Reinforcing Sealers are Provided in Second Modification>

FIG. 15 is a plan view of the inner panel 2B of the automobile hood 1 in an example in which reinforcing sealers are provided in the second modification.

In this modification, in addition to the configuration of the second modification described above, reinforcing sealers 30B to 33B are additionally provided. The reinforcing sealers 30B to 33B are provided in order to, in joints 21B of the linear sealer regions AB1 to AB3, connect together end portions which are not in contact with another linear sealer region.

Specifically, the linear sealer regions AB1, AB2 and AB3 have end portions 21$a$B, 21$b$B, and 21$c$B, respectively, each of which is arranged at an endmost portion on one side (the left side) in the longitudinal direction LB of the corresponding linear sealer region AB1, AB2 or AB3.

Further, the linear sealer regions AB1, AB2 and AB3 have end portions 21$d$A, 21$e$B, and 21$f$B, respectively, each of which is arranged at an endmost portion on the other side (the right side) in the longitudinal direction LB of the corresponding linear sealer region AB1, AB2 or AB3.

In this modification, the reinforcing sealers 30B to 33B connect together the end portions 21$a$B to 21$f$B of the plurality of the linear sealer regions AB1, AB2 and AB3 with longitudinal directions LB different from each other. Further, in the present modification, the reinforcing sealers 30B to 33B are joined to both of the inner panel 2B and the outer panel 3 to form the joints 21B.

More specifically, the reinforcing sealer 30B connects together the end portions 21$a$B and 21$b$B of the linear sealer regions AB1 and AB2 that are adjacent.

The reinforcing sealer 31B connects together the end portions 21$b$B and 21$c$B of the linear sealer regions AB2 and AB3 that are adjacent.

The reinforcing sealer 32B connects together the end portions 21$f$B and 21$e$B of the linear sealer regions AB3 and AB2 that are adjacent.

The reinforcing sealer 33B connects together the end portions 21$e$B and 21$d$B of the linear sealer regions AB2 and AB1 that are adjacent.

In the present modification, preferably each of the reinforcing sealers 30B to 33B extends in a direction that intersects with each of the longitudinal directions LB of the corresponding adjacent two linear sealer regions AB.

According to the configuration described above, the reinforcing sealers 30B to 33B cooperate with the sealers 20B of a plurality of linear sealer regions to form an annular sealer 40B. The outer circumference of the annular sealer 40B is formed by the linear sealer region AB1, the reinforcing sealers 30B and 31B, the linear sealer region AB3, and the reinforcing sealers 32B and 33B.

As described above, according to the present modification, the reinforcing sealers 30B to 33B are provided that connect together the end portions 21aB to 21fB of the plurality of linear sealer regions AB1 to AB3 with longitudinal directions LB different from each other. According to this configuration, at each of the end portions 21aB to 21fB, a state is not entered in which the joints 21B are abruptly discontinued at the end portions 21aB to 21fB. If a state is entered in which the joints 21B are abruptly discontinued at the end portions 21aB to 21fB, a change in the strength of the outer panel 3 in the vicinity of the end portions 21aB to 21fB will be large. In the case of such a state, there is room for improvement with respect to securing sufficient dent resistance of the outer panel 3 in the vicinity of the end portions 21aB to 21fB. Further, by providing the reinforcing sealers 30B to 33B that connect together the end portions 21aB to 21fB, a change in the strength of the outer panel 3 in the vicinity of the end portions 21aB to 21fB can be made small, and the dent resistance of the outer panel 3 in the vicinity of the end portions 21aB to 21fB can be further increased. By this means, the dent resistance of the outer panel 3 as a whole can be further increased.

Further, according to the present modification, the reinforcing sealers 30B to 33B cooperate with the linear sealer regions AB1 and AB3 to form the annular sealer 40B. According to this configuration, high dent resistance can be secured at the outer circumferential side portion of the outer panel 3. Further, by applying the reinforcing sealers 30B to 33B in an annular shape, the time required for applying the reinforcing sealers 30B to 33B can be further shortened.

Note that, the respective reinforcing sealers 30B to 33B need not be directly connected to the adjacent linear sealer regions A which the reinforcing sealers 30B to 33B connect, and there may be a gap of about several tens of mm or less therebetween. Further, a part of the annular sealer 40B may be interrupted. For example, in at least one of the reinforcing sealers 30B to 33B, a sealer having a dotted-line shape may be formed by a midway portion of the sealer being interrupted. The sealer having a dotted-line shape may be a sealer consisting of two sections, or may be a sealer consisting of three or more sections.

Further, in the second modification, a form in which the longest three linear sealer regions AB1 to AB3 are long in the width direction X has been described as an example. However, a different form may also be adopted.

<Modification of Second Modification>

For example, as illustrated in FIG. 16 that shows a modification of the second modification, three longest linear sealer regions AB1' to AB3' may extend along the longitudinal direction Y. In this case, linear sealer regions AB1' to AB4' are provided at intervals in the width direction X.

<Example in which Reinforcing Sealers are Provided in Modification of Second Modification>

FIG. 17 is a plan view of the inner panel 2B of the automobile hood 1 in an example where reinforcing sealers are provided in the modification of the second modification.

In this modification, in addition to the configuration of the second modification described above, reinforcing sealers 30B' to 35B' are additionally provided. The reinforcing sealers 30B' to 35B' are provided in order to, in the joints 21B of the linear sealer regions AB1' to AB4', connect together end portions which are not in contact with another linear sealer region.

Specifically, the linear sealer regions AB1', AB2', AB3', and AB4' have end portions 21aB' to 21dB', each of which is arranged at an endmost portion on one side (front side) in the longitudinal direction LB of the corresponding linear sealer region AB1', AB2', AB3', or AB4'.

Further, the linear sealer regions AB1', AB2', AB3', and AB4' have end portions 21eB' to 21hB', each of which is arranged at an endmost portion on the other side (rear side) in the longitudinal direction LB of the corresponding linear sealer region AB1', AB2', AB3', or AB4'.

In this modification, the reinforcing sealers 30B' to 35B' connect together the end portions 21aB' to 21hB' of the plurality of the linear sealer regions AB1' to AB4' with longitudinal directions LB different from each other. Further, in the present modification, the reinforcing sealers 30B' to 35B' are joined to both of the inner panel 2B and the outer panel 3 to form the joints 21B.

More specifically, the reinforcing sealer 30B' connects together the end portions 21aB' and 21bB' of the linear sealer regions AB1' and AB2' that are adjacent.

The reinforcing sealer 31B' connects together the end portions 21bB' and 21cB' of the linear sealer regions AB2' and AB3' that are adjacent.

The reinforcing sealer 32B' connects together the end portions 21cB' and 21dB' of the linear sealer regions AB3' and AB4' that are adjacent.

The reinforcing sealer 33B' connects together the end portions 21hB and 21gB of the linear sealer regions AB4' and AB3' that are adjacent.

The reinforcing sealer 34B' connects together the end portions 21gB' and 21fB' of the linear sealer regions AB3' and AB2' that are adjacent.

The reinforcing sealer 35B' connects together the end portions 21fB' and 21eB' of the linear sealer regions AB2' and AB1' that are adjacent.

In the present modification, preferably each of the reinforcing sealers 30B' to 35B' extends in a direction that intersects each of the longitudinal directions LB of the corresponding adjacent two linear sealer regions AB'.

According to the configuration described above, the reinforcing sealers 30B' to 35B' cooperate with the sealers 20B of a plurality of linear sealer regions to form an annular sealer 40B'. The outer circumference of the annular sealer 40B' is formed by the linear sealer region AB1', the reinforcing sealers 30B' to 32B', the linear sealer region AB4', and the reinforcing sealers 33B' to 35B'.

In the above embodiment and modifications, forms in which the inner panels 2, 2A, and 2B and the outer panel 3 are formed using steel sheets have been described as main examples. However, the inner panels 2, 2A, and 2B and the outer panel 3 need not be formed of steel sheets. The inner panel 2 and the outer panel 3 may be formed of a metal material such as an aluminum alloy or a magnesium alloy, or a resin material including glass fiber or carbon fiber or the like. Further, the inner panel 2 and the outer panel 3 may be formed of a composite material of a metal material and a resin material or the like.

INDUSTRIAL APPLICABILITY

The present invention can be widely applied as an automobile hood.

REFERENCE SIGNS LIST 1, 1A, 1B Automobile Hood
2, 2A, 2B Inner Panel
3 Outer Panel
20, 20A, 20B Sealer
21, 21A, 21B Joint
21a to 21l, 21aA to 21hA, 21aA' to 21hA', 21aB to 21fB, 21aB' to 21hB' End Portion
22, 22A Non-joint portion
30 to 39, 30A to 35A, 30A' to 35A', 30B to 33B, 30B' to 35B' Reinforcing Sealer
40, 40A, 40B Annular Sealer
A, AA, AB Linear Sealer Region
L, LA, LB Longitudinal Direction
B, BA, BB End-to-end region
9, 9A Unit
11, 11B Flange
12, 12B Inclined Wall
13 Bottom Portion
Y Longitudinal Direction (Front-rear Direction)
X Width Direction

The invention claimed is:

1. An automobile hood, comprising:
an inner panel,
an outer panel,
a sealer, and
a joint that, in the sealer, is a portion which joins the inner panel and the outer panel,
wherein:
a direction in which a linear sealer region in which the sealer is continuously arranged linearly extends is defined as a longitudinal direction;
a region of the inner panel that is a region which includes the linear sealer region and in which both ends in the longitudinal direction reach an outer circumference of the inner panel is defined as an end-to-end region;
at least three of the linear sealer regions are provided at intervals in at least one of a front-rear direction of the automobile hood and a width direction of the automobile hood;
each of three longest linear sealer regions among the plurality of linear sealer regions has a length that is 40% or more of a length of the end-to-end region to which the linear sealer region itself belongs, and the joint is formed therein; and
three end-to-end regions that include the three longest linear sealer regions among the plurality of linear sealer regions do not intersect with each other within a region that is surrounded by an outer circumferential edge of the inner panel.

2. The automobile hood according to claim 1, wherein:
the length is a length when the automobile hood is seen in plan view.

3. The automobile hood according to claim 1, wherein:
in at least one of the plurality of linear sealer regions, the joints are intermittently arranged in the longitudinal direction.

4. The automobile hood according to claim 1, wherein:
in at least one of the plurality of linear sealer regions, the joint extends continuously along the longitudinal direction.

5. The automobile hood according to claim 1, wherein:
at least one pair of linear sealer regions among the plurality of the linear sealer regions are arranged in parallel with each other.

6. The automobile hood according to claim 1, wherein:
the inner panel includes a unit;
the unit includes a flange that is arranged adjacent to the outer panel, an inclined wall that extends from the flange so as to separate from the outer panel, and a bottom portion that is continuous with the inclined wall and is separated from the flange; and
in at least one of the plurality of linear sealer regions, the joint is provided on the flange.

7. The automobile hood according to claim 6, wherein:
the flange of the unit is formed in an annular shape; and
in at least one of the plurality of linear sealer regions, all of the joints are arranged at places that are offset from a center of the annular-shaped flange.

8. The automobile hood according to claim 6, wherein:
a plurality of the units are provided in the inner panel; and
in at least one of the plurality of linear sealer regions, the joint is provided on the flange in each of a plurality of the units.

9. The automobile hood according to claim 6, wherein:
a plurality of the units having the same shape are arranged in the front-rear direction and the width direction of the automobile hood.

10. The automobile hood according to claim 1, wherein:
the sealer includes a reinforcing sealer;
the linear sealer region includes an end portion joint that is arranged at an endmost portion in the longitudinal direction among the joints of the linear sealer region; and
the reinforcing sealer connects together end portions of the end portion joints of the plurality of linear sealer regions in which the longitudinal directions are different.

11. The automobile hood according to claim 10, wherein:
the reinforcing sealer cooperates with the sealers of the plurality of linear sealer regions to form an annular sealer.

12. The automobile hood according to claim 1, wherein:
the inner panel is a steel sheet panel having a thickness of 0.25 mm to 0.80 mm, or is an aluminum alloy panel having a thickness of 0.40 mm to 1.20 mm.

13. The automobile hood according to claim 1, wherein:
the outer panel is a steel sheet panel having a thickness of 0.25 mm to 0.80 mm, or is an aluminum alloy panel having a thickness of 0.40 mm to 1.20 mm.

14. The automobile hood according to claim 1, wherein:
in three longest linear sealer regions, a portion of the sealer that is separated from either one of the inner panel and the outer panel is a non-joint portion; and
in each of the three longest linear sealer regions, the joint and the non-joint portion are alternately arranged in the longitudinal direction.

* * * * *